(12) United States Patent
Umezawa et al.

(10) Patent No.: US 7,157,012 B2
(45) Date of Patent: Jan. 2, 2007

(54) WATER TREATMENT DEVICE AND WATER TREATMENT METHOD USING THE SAME

(75) Inventors: Hiroyuki Umezawa, Ota (JP); Masahiro Iseki, Ota (JP); Daizo Takaoka, Ota (JP); Tsuyoshi Rakuma, Oizumi-machi (JP); Mineo Ikematsu, Ota (JP); Motoyuki Tsuihiji, Ota (JP); Hirofumi Iinuma, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 143 days.

(21) Appl. No.: 10/807,405

(22) Filed: Mar. 24, 2004

(65) Prior Publication Data
US 2004/0245184 A1 Dec. 9, 2004

(30) Foreign Application Priority Data
Mar. 26, 2003 (JP) .............................. 2003-086381
Mar. 26, 2003 (JP) .............................. 2003-086382

(51) Int. Cl.
*B01D 35/06* (2006.01)

(52) U.S. Cl. ...................... 210/748; 210/259; 210/295; 210/502.1

(58) Field of Classification Search ................ 210/748, 210/243, 295, 192, 712, 768, 791, 805, 669, 210/259, 332, 323.1, 502.1; 204/660, 665, 204/666, 672
See application file for complete search history.

(56) References Cited

U.S. PATENT DOCUMENTS

2003/0121864 A1* 7/2003 Kin et al. .................... 210/724

FOREIGN PATENT DOCUMENTS

| JP | 05-057285 | 3/1993 |
|----|-----------|--------|
| JP | 10-000473 | 1/1998 |
| JP | 10-085752 | 4/1998 |
| JP | 10-128370 | 5/1998 |
| JP | 11-090466 | 4/1999 |
| JP | 11-319493 | 11/1999 |
| JP | 2001-157894 | 6/2001 |
| JP | 2001-198418 | 7/2001 |
| JP | 2002-052388 | 2/2002 |

* cited by examiner

*Primary Examiner*—Robert A. Hopkins
(74) *Attorney, Agent, or Firm*—Morrison & Foerster LLP

(57) ABSTRACT

Object of the preferred embodiment is to remove sol-form microparticles and nitrogen components contained in CMP wastewater. Sol-form microparticle components contained in CMP wastewater are removed by a filtration treatment using a filter device 13, having a gel-form second filter. Also, nitrogen components in the CMP wastewater are removed by an electrochemical treatment using electrode 12. The filtration treatment and the electrochemical treatment can be carried out in individual tanks or can be carried out in the same tank. By performing the filtration treatment and the electrochemical treatment in the same tank, a space-saving water treatment device can be provided.

27 Claims, 17 Drawing Sheets

WATER TREATMENT DEVICE AND WATER TREATMENT METHOD USING THE SAME

BACKGROUND OF THE INVENTION

1. Field of the Invention

This invention concerns a water treatment device and a water treatment method using the same, and concerns the water treatment device and the water treatment method using the same for treating water containing extremely fine objects of removal and nitrogen components.

2. Description of the Related Art

Presently, the diminishing of the amount of industrial waste, separate collection and recycling of industrial waste, and prevention of release of industrial waste are considered to be ecologically-important topics and business issues as society moves towards the 21st Century.

Some types of industrial waste comprise various types of fluids containing objects of removal; i.e., substances to be removed. Such fluids are known by a variety of expressions, such as sewage, drainage, and effluent. Fluids, such as water or chemicals, containing substances that are objects of removal, shall be hereinafter referred to as "wastewater." The objects of removal are eliminated from wastewater by means of an expensive filtration system or a similar system. Wastewater is thereby recycled as a clean fluid, and the removed objects of removal or substances that cannot pass through the filtration system are disposed of as industrial waste. In particular, water is sent back to a natural setting, such as a river or sea, or recycled after being purified so as to meet environmental standards.

Adoption of such a filtration system is difficult because of costs incurred in constructing and running a filtration system, thus posing an environmental problem.

As can be seen from the above, wastewater treatment techniques are important in terms of recycling and prevention of environmental contamination, and immediate demand exists for a filtration system that incurs low initial and running costs.

By way of illustration, wastewater treatment as practiced in the field of semiconductors shall now be described. When a plate member formed, for example, from a metal, a semiconductor, or ceramic, is ground or abraded, an abrasion (or grinding) jig or the plate member is subject to a shower of a fluid, such as water, for preventing an increase in the temperature of the abrasion (or grinding) jig, which would otherwise be caused by friction, for improving lubricity, and for preventing adhesion of abrasion or grinding waste onto the plate member.

More specifically, in the process of dicing or back-grinding of plate-like semiconductor material; e.g., a semiconductor wafer, pure water is made to flow over the semiconductor wafer. In a dicing machine, a shower of pure water is made to flow over a semiconductor wafer, or pure water is squirted onto a dicing blade from a discharge nozzle in order to prevent an increase in the temperature of the blade or adhesion of dicing waste onto the semiconductor wafer. For the same reason, a flow of pure water is employed during an operation in which a semiconductor wafer is made thin by means of back-grinding.

Wastewater, which has mixed therein grinding or abrasion waste and is discharged from the dicing or back-grinding machine, is returned to a natural setting or recycled after having been purified through a filter. Alternatively, concentrated wastewater is recovered.

In a current process for manufacturing a semiconductor, wastewater, in which objects of removal (i.e., waste) primarily including Si are mixed, is disposed of according to either of two methods; i.e., a coagulating sedimentation method and a method, which employs a filter and a centrifugal separator in combination.

Under the coagulating sedimentation method, polyaluminum chloride (PAC) or aluminum sulfate ($Al_2(SO_4)_3$) is mixed in the wastewater as a coagulant to generate a reaction product with Si and the wastewater is filtrated to remove this reaction product.

Under the method that employs a filter and a centrifugal separator in combination, the wastewater is filtrated, the concentrated wastewater is processed by the centrifugal separator to recover the silicon waste as sludge, and the clear water resulting from filtration of the wastewater is released to a natural setting or is recycled.

For example, as shown in FIG. 16, wastewater discharged during a dicing operation is collected into a raw water tank 201 and is sent by a pump 202 to a filtration unit 203. A ceramic-based or organic-based filter F is provided in filtration unit 203, and the filtrated water is delivered via a pipe 204 to a collected water tank 205 for recycling. Alternatively, the filtrated water is released to a natural setting.

In filtration unit 203, since clogging of filter F occurs, washing is carried out periodically. For example, a valve B1 connected to raw water tank 201 is closed, a valve B3 and a valve B2, for delivering washing water from the raw water tank are opened, and filter F is cleaned by a reverse flow of water from collected water tank 205. The resultant wastewater containing a high concentration of Si waste is returned to raw water tank 201. Also, the concentrated water in a concentrated water tank 206 is transported via a pump 308 to centrifugal separator 209 and is thereby separated into sludge and separated fluid. The sludge comprising Si waste is collected into a sludge recovery tank 210 and the separated fluid is collected into a separated-fluid tank 211. After further accumulation of the separated fluid, the wastewater in separated-fluid tank 211 is transported to raw water tank 201 via pump 212.

These methods have also been employed for the recovery of waste resulting from grinding or abrasion of a solid or plate-like member formed essentially from a metal material, such as Cu, Fe, Al, etc., or from grinding or abrasion of a solid or plate-like member formed from ceramic or other inorganic material.

Chemical-mechanical polishing (CMP) has come to be employed as a new semiconductor processing technology.

This CMP technique enables (1): the realization of smooth device surface shapes; and (2): the realization of structures with embedded materials that differ from the substrate.

With regard to (1) above, fine patterns are formed precisely using lithography techniques. The combined use of techniques for affixing Si wafers enables materialization of three-dimensional IC's.

With (2), embedded structures are made possible. Since priorly, a technique of embedding tungsten (W) has been employed in multilayer wiring of IC's. With this technique, W is embedded by a CVD method in a trench of an interlayer film and the surface is made smooth by etching back. However, smoothing by CMP has come to be employed recently. Other examples of application of this embedding technique include damascene processes and element separation.

Such CMP techniques and applications are described in detail in "Science of CMP," published by Science Forum Co., Ltd.

A mechanism for a CMP process shall now be described briefly. As shown in FIG. 17, a semiconductor wafer 252 is placed on an abrasive cloth 251 placed over a rotary table 250, and irregularities of the wafer 252 surface are eliminated by performing lapping, polishing, and chemical etching while pouring on an abrasive (slurry) 253. Smoothing is achieved by chemical reactions induced by a solvent included in abrasive 253 and by mechanical abrasive actions of the abrasive cloth and the abrasive grains in the abrasive. Foamed polyurethane or non-woven fabric, etc., is used for example as abrasive cloth 251. The abrasive has abrasive grains of silica, alumina, etc., mixed in water containing a pH regulator and is generally referred to as slurry. Lapping is performed while pouring on this slurry 253 and applying pressure onto abrasive cloth 251 while rotating wafer 252. 254 indicates a dressing part, which maintains the abrading ability of abrasive cloth 251 and constantly keeps the surface of abrasive cloth 251 in a dressed condition. 202, 208, and 212 indicate motors and 255 to 257 indicate belts.

The above-described mechanism is arranged as a system as shown for example in FIG. 18. This system largely comprises a wafer cassette loading/unloading station 260, wafer transfer mechanism part 261, the abrasive mechanism part 262, which was described using FIG. 12, a wafer cleaning mechanism part 263, and a system controller for controlling these parts.

A cassette 264 having wafers stored therein is placed in wafer cassette loading/unloading station 260, and a wafer is taken out of cassette 264. In the wafer transfer mechanism part 261, the wafer is retained, for example, by a manipulator 265, and is placed on rotary table 250 disposed in abrasive mechanism part 262. The wafer is then smoothed by means of the CMP technique. After smoothing of the wafer has been completed, the wafer is transported by means of manipulator 266 to wafer cleaning mechanism part 263 wherein the slurry is cleaned off of the wafer. The washed wafer is then housed in wafer cassette 266.

The amount of slurry used for one abrasion process is about 500 cc to 1 liter/wafer. Also, pure water is made to flow in the above-described abrasive mechanism part 262 and wafer cleaning mechanism part 263. Since the resulting wastewater are merged in the final stage at a drain, about 5 to 10 liters/wafer of wastewater flows out during a single smoothing operation. In the case of producing, for example, a three-layer-metal wafer, about seven smoothing operations are required for smoothing the metal and interlayer dielectric films. Thus wastewater of an amount of seven times the 5 to 10 liters is discharged for production of a single wafer.

It can thus be understood that the use of a CMP machine involves discharge of a considerable amount of slurry diluted with pure water.

Furthermore, a CMP slurry, which is employed in oxide films, contains ammonia. Wastewater generated from a CMP device thus contains ammonia and other nitrogen components. In general, such nitrogen components are subject to biological treatment, which is carried out in the two steps of a nitration step of first converting ammonia nitrogen to nitrate nitrogen and a denitrification step of converting the nitrate nitrogen to nitrogen gas.

However, chemicals are used as coagulants in a coagulating sedimentation method. Specifying the amounts of chemicals that will react completely is very difficult, and hence excess amounts of chemicals are loaded and unreacted chemicals remain. Oppositely, if the amounts of chemicals are low, not all of the objects of removal will coagulate and settle out and some of the objects of removal will thus remain unseparated. Especially in a case where excess amounts of chemicals are used, chemicals will remain in a supernatant liquid, and with regard to recycling, such a supernatant liquid could not be recycled for use in applications in which chemical reactions must be avoided since the chemicals remain in the liquid even after passage through a filter.

Also, floc, which is a reaction product of a chemical and objects of removal, is generated in the form of a tuft-like suspended solid. Production of such floc is achieved under strict pH conditions and require an agitator, a pH measurement instrument, a coagulant injection apparatus, and a control equipment for controlling these components. Also, stable sedimentation of floc requires a large-size precipitation tank. For example, for a wastewater treatment capacity of 3 cubic meters($m^3$)/hour, a precipitation tank with a diameter of 3 meters and a depth of about 4 meters (i.e., a precipitation tank with a capacity of about 15 tons) is required. As a result, the entire system will be large-scale system requiring a floor space of about 11 meters×11 meters.

Furthermore, some of the floc float on the surface without settling to the bottom of the precipitation tank and such floc may flow out of the precipitation tank. The recovery of all of the floc is thus difficult. In short, the known filtration system suffers such problems as large facility size, high initial costs required by the system, difficulties in recycling water, and high running costs incurred by use of chemicals.

On the other hand, with a method, such as that shown in FIG. 16, which employs a filter having a filtering capacity of 5 cubic meters ($m^3$)/hour and a centrifugal separator in combination, the recycling of water becomes possible due to the use of a filter F (which is called a UF module and comprises polysulfone fibers or a ceramic filter) in filtration unit 203. However, filtration unit 203 is equipped with four filters F and, in view of the life of the filters F, the high-priced filters F, costing about 500,000 yen each, had to be replaced at least once a year. Furthermore, since filters F are to be used with a pressure filtration method, clogging of the filters placed a large motor load and pump 202 thus had to be made high in capacity. Also, of the wastewater passing through filter F, about two-thirds are returned to raw water tank 201. Furthermore, wastewater containing objects of removal is transported by pump 202, causing the interior wall of pump 202 to be scraped by the objects of removal and thus greatly shortening the life of pump 202.

To summarize the above, the known filtration system suffers high running costs, specifically, the cost of electricity consumed by the motor and expenditures required for replacing pump P and filters F.

Furthermore, in comparison to a dicing process, an incomparable amount of wastewater is discharged during a CMP process. The slurry is distributed in the form of a colloid in a fluid and does not precipitate readily due to Brownian motion. Moreover, the abrasive grains mixed in the slurry is very minute and comprise grains with particle diameters of 10 to 200 nm. When the slurry comprising such fine abrasive grains is filtrated through a filter, the abrasive grains enter the pores of the filter and cause clogging immediately and frequently, thus making treatment of a large amount of wastewater impossible.

Furthermore, the wastewater generated from a CMP device contains ammonia and other nitrogen components and presently, such nitrogen components are removed by biological treatment. Thus two reaction tanks are required and since the treatment time is slow, the treatment efficiency is poor. Also with the biological treatment, a large-volume anaerobic tank is required to hold denitrifying bacteria and this causes the equipment construction cost to rise steeply and the device installation area to increase. Furthermore, the denitrifying bacteria are influenced significantly by the surrounding temperature environment as well as by components contained in the water to be treated and in particular, become lowered in activity in the winter when the temperature drops, thus decreasing in denitrifying action and causing the treatment efficiency to become unstable.

Furthermore, whereas the particle diameters of the abrasive grains contained in a normal CMP slurry are approximately 100 nanometers, the abrasive grains used in dry CMP, which has emerged as a new CMP method, are extremely fine particles of particle diameters of approximately 20 to 30 nanometers. Separation of such fine particles is extremely difficult.

Thus main object of this invention is to provide a water treatment device and a water treatment method using the same for treating fluids, such as CMP wastewater, that contain microparticles and nitrogen components. Another object of this invention is to provide a wastewater treatment device, which combines coagulation by electrochemical treatment and filtration treatment, and a wastewater treatment method using the same.

SUMMARY OF THE INVENTION

The water treatment device of preferred embodiment comprising a filter device, in turn comprising: a first filter, immersed in a fluid containing objects of removal; and a second filter, formed of a gel film that is adsorbed onto the surface of the first filter; and a pair of electrodes, removing nitrogen compounds from the fluid by an electrochemical method.

Furthermore, the water treatment method of preferred embodiment comprising carrying out the microparticles by a gel-form second filter, formed of the coagulates and formed on the surface of a first filter, and removing nitrogen compounds from the fluid by an electrochemical method.

Furthermore, the water treatment device of preferred embodiment comprising an electrode, containing a metal from which are eluted coagulating ions that bond with objects of removal that are contained in a fluid, and a filter device, filtering the coagulated objects of removal in the fluid.

Furthermore, the water treatment device of preferred embodiment comprising an electrode, which, by the elution of coagulating ions that bond with objects of removal, forms coagulates that are greater in diameter than the objects of removal, and a filter device, filtering the coagulates.

Furthermore, the water treatment method of preferred embodiment comprising wherein objects of removal contained in a fluid are coagulated by the elution of coagulating ions and the objects of removal that have coagulated are filtered by a filter device.

Furthermore, the water treatment method of preferred embodiment comprising wherein coagulates that are greater in diameter than objects of removal contained in a fluid are formed by the elution of coagulating ions and the coagulations are filtered by the filter device.

Generally in order to remove fine particles, such as the abrasive grains mixed in a CMP slurry, a filter film with pores smaller than such particles is employed. However, with this invention, a gel film, which has a high degree of swelling and is formed by a weak suction pressure, is employed and the property that water permeates through this gel film is used to realize filtration. Furthermore, with this invention, even if the gel film filter becomes clogged due to continued filtration, the filter can be regenerated to continue filtration and thus realize filtration over a long period of time. Also, since the nitrogen components in the fluid are removed by an electrochemical method, stable and definite treatment of the nitrogen components can be carried out in comparison to related-art biochemical methods. This preferred embodiment provides the following effects.

Since electrodes for treating nitrogen components by electrolytic treatment and a filter device for filtration treatment of sol-form microparticles are equipped, purification of CMP wastewater that contains ammonia components can be performed. In the case where filtration is performed after electrolytic treatment, since the coagulation of microparticles can be carried out in the electrolytic treatment step, the merit that the subsequent filtration step is facilitated is provided. In the case where electrolytic treatment and filtration treatment are performed in the same tank, the above merit is provided and at the same time, the merit of saving space is provided. Furthermore, in the case where electrolytic treatment is performed after performing filtration treatment, since filtrated water, from which microparticles have been removed by the filtration treatment, is subject to electrolytic treatment, the merit that microparticles are prevented from becoming attached to the electrodes for performing electrolytic treatment is provided.

Generally in order to remove microparticles of a size class of mainly 0.15 µm or less, such as the abrasive grains mixed in a CMP slurry, a filter film with pores smaller than such microparticles should be employed. However, since such a filter film does not exist, such filtration could not be performed. However this preferred embodiment realizes, by the forming of a gel film filter, the filtration of the objects of removal of a colloidal solution without the use of a filter film having mainly pores that are smaller than 0.15 µm.

Also, since the gel film filter is formed from a fluid of the objects of removal contained in a sol, filtration without addition of a coagulant or other chemical and without the use of a filter with microscopic pores is realized.

Furthermore, the second filter comprising the gel film can be formed by gelling of microparticles onto the surface of the first filter and by setting a weak suction pressure and sucking the wastewater slowly, a method of filtering extremely high filtration efficiency is realized.

Furthermore, by selecting optimal forming conditions for the second filter comprising the gel film and maintaining the filtration flow rate at a fixed value, filtration that is extremely unlikely to be subject to clogging and extremely long in filtration time is realized.

Furthermore, filtration of CMP slurries used for manufacture of CSP semiconductor devices is realized and the advantage of enabling the large quantities of abrasive grains contained in a CMP slurry and the electrode material waste, silicon and silicon oxide film waste, which are discharged by CMP, to be filtrated at the same time is provided.

Also with this preferred embodiment, since the gel that has become adsorbed onto the surface of the second filter through continued filtration can be separated using the gel's own weight by stopping the suction by the pump, the advantage that the second filter can be regenerated readily is provided. It has thus become possible to perform the filtration step, regeneration step, and refiltration step several times and continue filtration over an extremely long period of time.

Furthermore with this preferred embodiment, the gel that has become adsorbed onto the surface of the second filter is separated using the outwardly swelling force of the filtration unit as it returns to its original state by simply stopping the suction by the pump in the process of regenerating the second filter. This preferred embodiment thus provides the advantage of making the burdensome process of reverse washing, which was required with related-art filtration devices, completely unnecessary. There is also provided the advantage that by increasing the amount of bubbles in the regeneration step in comparison to that during the filtration step, forces generated by the ascending force and rupturing of the bubbles are added to the surface of the second filter, thereby promoting the separation of the gel.

Yet furthermore, since with a filtration device that realizes the preferred embodiment, suction by a weak suction pressure is carried out so as not to clog the second filter, the effects can be realized by a small pump. Moreover, since filtrated water passes through the pump, there is no worry of wear due to the objects of removal and the life of the pump is extended significantly. The system scale can thus be reduced, savings can be made in the electric cost for pump operation, and since pump replacement costs are also held down significantly, both the initial cost and running cost can be reduced.

Also, since the wastewater is concentrated just in the raw water tank, extra piping, tanks, pumps, etc., are made unnecessary and a resource-saving filtration system can be arranged.

By coagulating objects of removal contained in a fluid by the electrochemical actions of electrodes 12 and filtering the coagulated objects of removal, wastewater, in which fine, sol-form objects of removal are mixed, can be treated. Specifically, by the electrochemical actions of electrodes 12, the silica contained in the wastewater reacts with the iron of an electrode to form iron-silica polymer compounds. Since the particle diameters of the objects of removal can thereby be enlarged, subsequent filtration treatment is facilitated. Furthermore, since the iron-silica polymer compounds in themselves act as coagulants, the other objects of removal that are contained in the wastewater are coagulated as well.

Furthermore, by performing electrochemical treatment upon switching the polarity of the electrodes, the nitrogen components contained in the wastewater can also be removed.

DESCRIPTION OF THE PREFERRED EMBODIMENTS

First Embodiment

Figure 1A:
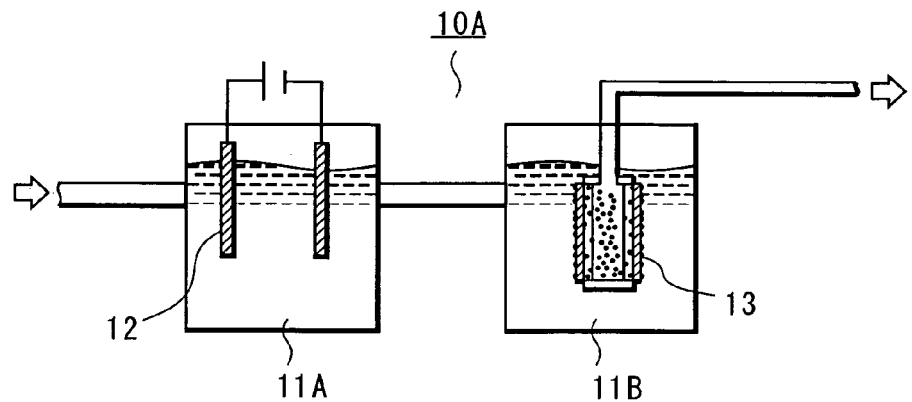
FIG. 1 is a schematic view (A), a schematic view (B), and a schematic view (C) showing the basic principles of a water treatment device of this preferred embodiment and a water treatment method of this preferred embodiment.

The definitions of the terms used for describing this preferred embodiment shall now be clarified.

A "colloidal solution" refers to a state wherein microparticles of diameters of 1 nm to 1 μm are dispersed in a medium. These microparticles undergo Brownian motion and have a property of passing through ordinary filter paper but not passing through a semipermeable film. These microparticles also have a property of being extremely slow in coagulation rate, which is considered to be due to the reduced opportunity of mutual approach of the microparticles resulting from the acting of electrostatic repulsive forces among the microparticles.

The term "sol" is used substantially synonymously to "colloidal solution," and unlike a gel, a sol is dispersed in liquid, exhibits fluidity, and the microparticles undergo active Brownian motion.

A "gel" refers to a state wherein colloidal particles have lost their abilities to move independently and have grouped together and solidified. For example, though agar or gelatin becomes dispersed and becomes a gel when dissolved in warm water, this sol loses fluidity and turns to a gel when cooled. Among gels are hydrogels, which have a high liquid content, and xerogels, which are somewhat dry.

Causes of gelation include drying by removal of the water that is the dispersant, adjustment of the pH of a silica slurry (pH 9 to 10) to pH 6 to 7 by addition of an electrolyte, reduction of fluidity by cooling, etc.

A "slurry" refers to a colloidal solution or sol, which is used for abrading and is prepared by mixing particles, a liquid, and chemicals. An abrasive used in CMP is called a "CMP slurry." Known examples of CMP slurries include silica abrasives, aluminum oxide (alumina) abrasives, cerium oxide (ceria) abrasives, etc. Among these, silica abrasives are used most often, and among such silica abrasives, colloidal silica is used widely. Colloidal silica is a dispersion in which silica ultramicroparticles with a colloid size of 7 to 300 nm are dispersed uniformly without settling in water or an organic solvent and is also referred to as "silica sol." With this colloidal silica, particles are monodispersed in water, and the mutual repulsive forces among the colloidal particles thus prevent the particles from settling even when left still for a year or more. Furthermore, a CMP slurry, which is employed in oxide films, contains ammonia.

This preferred embodiment provides a method of filtering, with which objects of removal are removed by filtration from wastewater of a state wherein the objects of removal are contained in a fluid in the form of a colloidal solution or sol.

The objects of removal take the form of a colloidal solution (sol) containing large amounts of microparticles with a particle distribution of 3 nm to 2 μm. Examples include abrasive grains of silica, alumina, or ceria, etc., that are used in CMP and semiconductor waste, metal waste, and/or insulating film material waste that are produced by abrasion by the abrasive grains. With the present embodiment, ILD1300 oxide films abrading slurry, made by Rodel Nita Corp., was used as the CMP slurry. This slurry has a pH of 10 and has silica with a grain size distribution of 10 to 350 nm as its principal component. The slurry is kinds of ammonia, and tends to disperse on account of strong alkali. Accordingly the slurry is hard to gel.

Second Embodiment

The treatment device of this preferred embodiment shall now be described in outline with reference to FIG. 1. The treatment device 10 of this preferred embodiment is equipped with a filter device 13, comprising a first filter, which is immersed inside a fluid that contains objects of removal, and a second filter, formed of a gel film that is adsorbed onto the surface of the first filter, and a pair of electrodes 12 for treating nitrogen compounds by an electrochemical method. With the wastewater treatment method of this preferred embodiment, the fluid is filtered through the gel-form second filter that is formed on the surface of the first filter to remove microparticle components of the objects of removal, and nitrogen compounds, contained in the fluid, are treated by the electrochemical method. The arrangement of this water treatment device 10 and the water treatment method using the same shall now be described.

The arrangement, etc. of a water treatment device 10A shall be described with reference to FIG. 1A. Electrodes 12 for performing the treatment of a fluid by an electrochemical method are installed in a first tank 11A. Filter device 13, for performing filtration by the second filter, formed of a gel film, is installed in a second tank 11B.

A fluid, which contains colloidal objects of removal and is a water to be treated that contains CMP wastewater, etc., flows into first tank 11A. Here, a fluid to which some form of pretreatment has been applied can be made to flow in to first tank 11A. By then applying electricity across electrodes 12, electrochemical treatment of the fluid is carried out. The electrochemical treatment here is, for example, the removal of nitrogen and the details thereof shall be described with reference to FIG. 3. A promoter, having halogen ions or a compound containing a halogen element added thereto, is added to the fluid in first tank 11A to promote the electrochemical treatment. Specifically, by adding potassium chloride or sodium chloride, etc. to the fluid, the abovementioned electrochemical treatment can be carried out more efficiently. Furthermore by this electrochemical treatment, hypochlorous acid is generated. Thus by the electrolytic reaction of the silica contained in the CMP wastewater with the hypochlorous acid, the silica microparticles are coagulated. The fluid that has been subject to the electrochemical treatment in the first tank flows into second tank 11B via a pipe, etc.

In second tank 11B, the fluid, which has been subject to the electrochemical treatment in first tank 11A, is contained and filtration by filter device 13, which performs filtration using the gel film, is carried out. The details of filter device 13 shall be described later with reference to FIG. 7 onwards. Also when a promoter containing chlorine ions is added to the fluid in first tank 11A, since the silica microparticles are coagulated, the formation of the second filter that is formed of the gel film and the filtration of the silica microparticles and other objects of removal using the second filter are facilitated. The fluid that has been filtered by filter device 13 is discharged out of the system of water treatment device 10A. The filtrated water that is obtained here is filtered to a transmittance of 99.8% or more and is furthermore removed of nitrogen compounds.

Figure 1B:
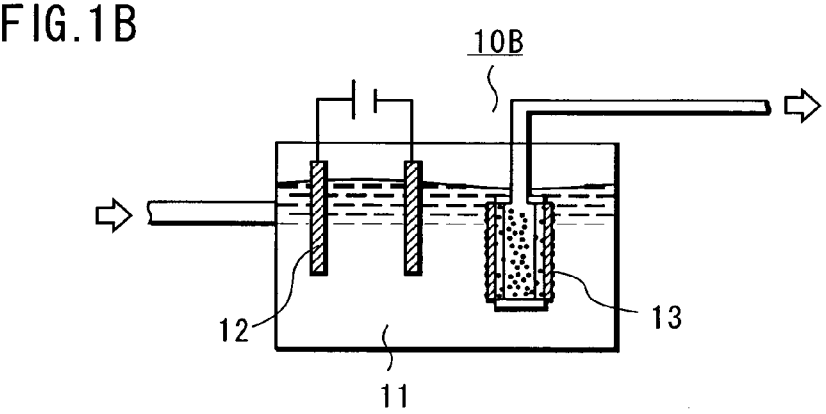

The arrangement, etc. of a water treatment device 10B shall now be described with reference to FIG. 1B. Here, electrodes 12 and filter device 13 are installed in a single tank 11. That is, since electrochemical treatment and filtration of a fluid are carried out in a single tank, a more compact water treatment device can be provided. This device has the merit that the same coagulation effect as that described above is provided in the case where a promoter containing a halogen element is added to the fluid.

Figure 1C:
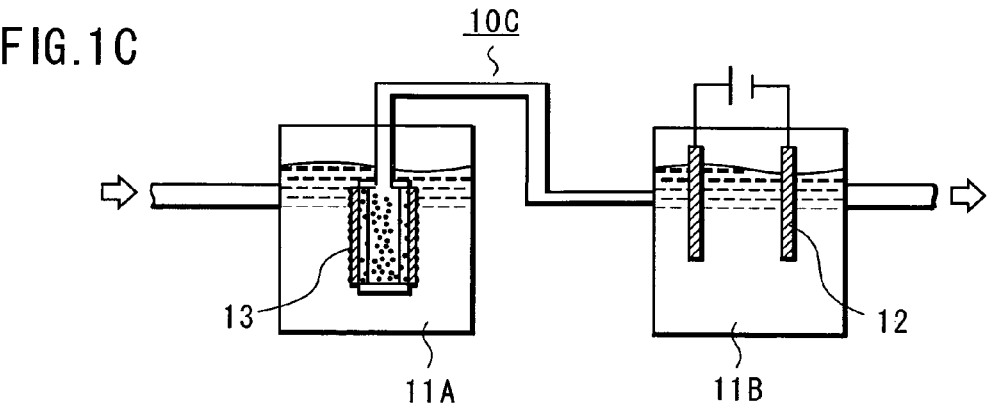

The arrangement, etc. of a water treatment device 10C shall now be described with reference to FIG. 1C. Here, filter device 13 is installed in first tank 11A and electrodes 12 are installed in second tank 11B. Wastewater treatment is thus carried out in the reverse order as that of water treatment device 10A shown in FIG. 1A. That is, after filtering out colloidal microparticles by means of filter device 13, installed in first tank 11A, the filtrated liquid is received by second tank 11B for treatment of the nitrogen components contained in the filtrated liquid by electrodes 12. Since electrochemical treatment by electrodes 12 is thus carried out on clear, filtrated liquid, the attachment of silica components onto electrodes 12 and the resulting lowering of the treatment ability of the electrodes can be prevented.

Figure 2:
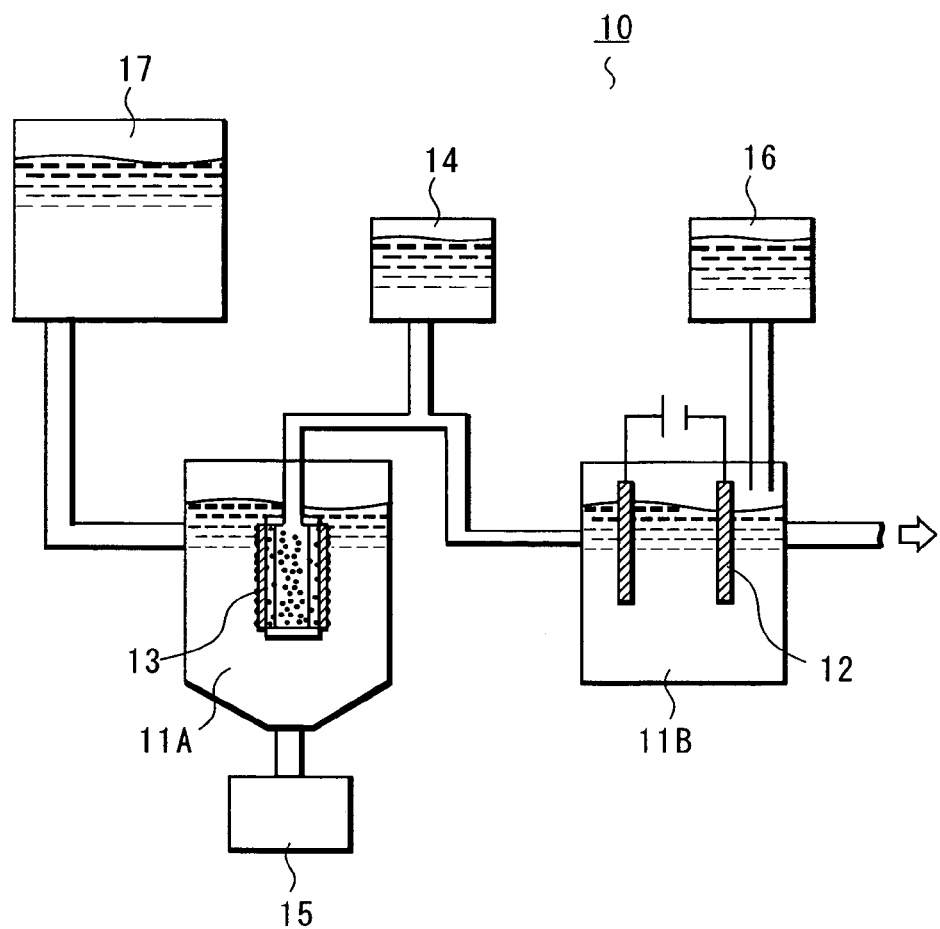
FIG. 2 is a schematic view showing the arrangement of a specific water treatment device of this invention.

The arrangement of a more specific water treatment device 10 shall now be described with reference to FIG. 2.

CMP wastewater, discharged from a CMP device, is stored in a wastewater receiving tank 17. The CMP wastewater then flows into first tank 11A via a pipe.

At first tank 11A, filter device 13, having a self-forming filter formed of a gel film on the surface, is immersed inside the fluid, and sol-form microparticle components contained in the CMP wastewater are removed by this filter device 13. With the progress of filtration, a gel of the coagulated sol-form microparticles contained in the CMP wastewater sediment at the bottom part of first tank 11A. The sedimented gel is transferred to a gel recovery tank 15.

The filtrated water that has been filtered by filter device 13 is transported via a pipe to second tank 11B for performing electrochemical treatment. Also, a part of the filtrated water is stored in a separation water tank 14. Separation water tank 14 is disposed above the water level of the fluid stored in first tank 11A and is used to separate the second filter, formed of the gel film, of filter device 13. Specifically, the separation of the second filter is carried out by the reverse flow of the filtrated water, stored in separation water tank 14, into filter device 13. This separation of the second filter shall be described in detail with reference to FIG. 13.

At second tank 11B, the fluid that has been filtered by filter device 13 is stored and ammonia and other nitrogen compounds contained in the filtrated water are treated by the electrochemical method using electrodes 12. Also, a promoter, such as sodium chloride or potassium chloride, etc., can in some cases be added into second tank 11B from a promoter supply tank 16. The electrochemical treatment can thereby be promoted further. The fluid from which the nitrogen components have been removed is discharged out of the system of water treatment device 10 and is returned to nature or is reused.

Figure 3:
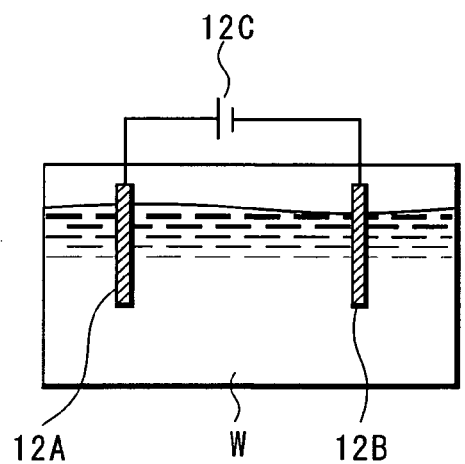
FIG. 3 is a schematic view showing the principles of the electrodes of the water treatment device of this preferred embodiment.

The specific arrangement of electrodes 12 and the electrochemical treatment of fluid using the electrodes shall now be described with reference to FIG. 3.

Electrodes 12 comprise an anode electrode 12A and cathode electrode 12B, which are immersed in the fluid, and has a power supply 12C for applying electricity across the electrodes. A control means for controlling these electrodes 12 and a stirring means for stirring fluid W inside the tank can also be provided.

As the material of cathode electrode 12B, an electric conductor, containing an element of group 1$b$ or group 2$b$ or group 8 of the periodic table, or a material, having an element of the same group coated onto an electric conductor, can be employed. Specifically, cathode electrode 12B is formed of copper, iron, or an alloy or sintered body of copper and zinc, copper and iron, copper and nickel, or copper and aluminum.

As anode electrode 12A, an insoluble electrode, formed of an insoluble metal, such as platinum, indium, palladium, or an oxide thereof, etc., or carbon can be employed. Also, by providing a shielding wall so as to surround anode electrode 12A, oxygen bubbles generated from anode electrode 12A can be prevented from moving towards cathode electrode 12B side.

The method of treating nitrogen components by electrodes 12 arranged in the above manner shall now be described.

One or more pairs of anode electrode 12A and cathode electrode 12B are immersed inside fluid W and power supply 12C is turned ON by means of the abovementioned control device to apply electricity across cathode electrode 12B and anode 12A. Nitrate ions contained in the water to be treated are thereby converted into nitrite ions by a reduction reaction at the cathode electrode 12B side (reaction A). The nitrite ions generated by the nitrate ion reduction reaction are converted further by a reduction reaction into ammonia (reaction B). Reaction A and reaction B are as follows:

Reaction $A$ $NO_3^- + H_2O + 2e^- \rightarrow NO_2^- + 2OH^-$

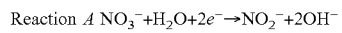

Reaction $B$ $NO_2^- + 5H_2O + 6e^- \rightarrow NH_3(aq) + 7OH^-$

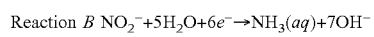

Meanwhile, at the anode electrode 12A side, active oxygen and hypochlorous acid are generated from the surface of anode electrode 12A and by these, nitrogen gas is generated by the denitrification of ammonia in the water to be treated (reaction C). Also, in order to promote the denitrification of ammonia at anode 5, halogen ions, such as chlorine ions, iodine ions, bromine ions, etc., or compounds containing such halogen ions, for example, sodium chloride, potassium chloride, etc., are added into the water to be treated. In this case, the amount of chlorine ions of the sodium chloride that is added to the water to be treated is set, for example, to no less than 10 ppm and no more than 40000 ppm. In the case where, for example, sodium chloride is thus added to the water to be treated, the sodium chloride is oxidized at the anode and chlorine is generated (reaction D), and the generated chlorine reacts with water in the water to be treated to generate hypochlorous acid (reaction E). The generated hypochlorous acid then reacts with the ammonia that exists in the water to be treated and, after a plurality of chemical changes, is converted into nitrogen gas (reaction F). The reactions C through reaction F are as follows:

Reaction $C$ $2NH_3(aq) + 3(O)N_2\uparrow + 3H_2O$

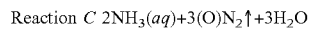

Reaction $D$ $NaCl \rightarrow Na^+ + Cl^-$

$2Cl^- \rightarrow Cl2 + 2e^-$

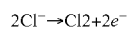

Reaction $E$ $Cl_2 + H_2O \rightarrow HClO + HCl$

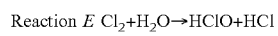

Reaction $F$ $2NH_4 + 4HClO \rightarrow N_2\uparrow + 4HCl + 4H_2O$

The nitrate nitrogen, nitrite nitrogen, ammonia nitrogen, and other nitrogen compounds in the water to be treated can thus be treated inside the tank. The merit that the silica microparticles contained in fluid W undergo an electrolytic reaction with the abovementioned NaCl and coagulated particles of silica are thereby formed to facilitate the filtration process is also provided.

Third Embodiment

The wastewater treatment device of this preferred embodiment shall now be described in outline with reference to FIG. 4. The wastewater treatment device 10 of this preferred embodiment is equipped with a pair of electrodes 12, wherein a metal, from which coagulating ions that bond with objects of removal contained in a fluid are eluted, is used as the anode electrode, and a filter device 13, which filters the objects of removal in the fluid that have been coagulated by means of electrode 12. Furthermore, with the wastewater treatment method of this preferred embodiment, the pair of electrodes 12, wherein a metal, from which coagulating ions are eluted, is used as the anode electrode, is immersed in the fluid, electricity is applied across the electrodes to coagulate the objects of removal that are contained in the fluid, and the fluid containing the coagulated objects of removal are filtered by filter device 13. The arrangement of wastewater treatment device 10 and the wastewater treatment method using this device shall now be described. Here, as the fluid, CMP wastewater shall be taken up as an example. Though CMP wastewater contains extremely fine objects of removal of approximately 20 nanometers in particle diameter, these fine objects of removal are removed from the fluid by this the arrangement of this preferred embodiment that shall be described in detail below.

Figure 4A:
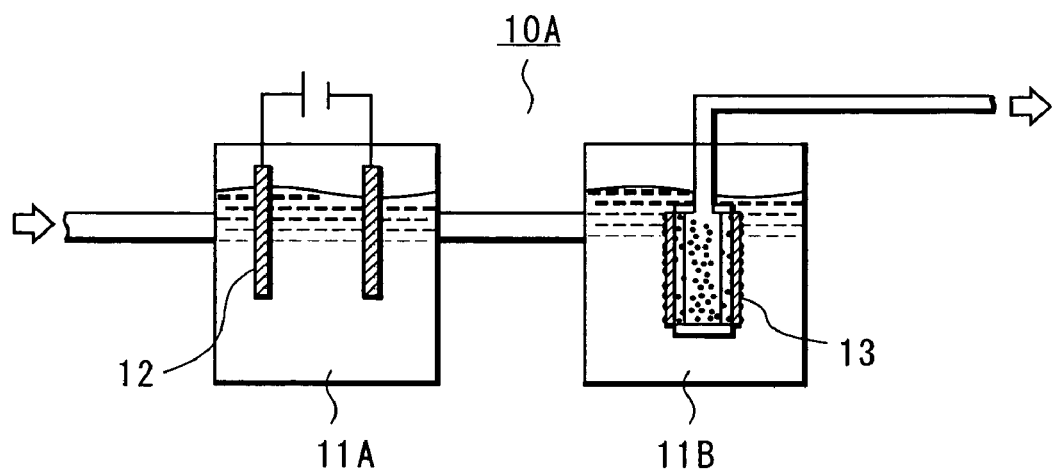
FIG. 4 is a schematic view (A) and a schematic view (B) showing the arrangement of a specific wastewater treatment device of this invention.

The arrangement, etc. of wastewater treatment device 10A shall now be described with reference to FIG. 4A. Electrodes 12 for treating the fluid by an electrochemical method are installed in a first tank 11A. Filter device 13, for performing filtration by a second filter that is formed of a gel film, is installed in a second tank 11B.

A fluid, which is CMP wastewater or other fluid containing colloidal objects of removal, flows into first tank 11A. Abrasive grains with diameters of several dozen nanometers are contained in the CMP wastewater. Here, a fluid that has been subject to some form of pretreatment can be made to flow into first tank 11A. By then applying electricity across electrodes 12, electrochemical treatment of the fluid is carried out. The electrochemical treatment here refers to the coagulation effect due to metal ions that have dissolved from an electrode and the details thereof shall be described with reference to FIG. 6. In order to promote this electrochemical treatment, a promoter, having chlorine ions or a compound containing chlorine ions added thereto, can be added to the fluid contained in first tank 11A. Specifically, by adding potassium chloride or sodium chloride, etc. to the fluid, the abovementioned electrochemical treatment can be carried out more efficiently. The fluid that has been subject to the electrochemical treatment in the first tank flows into second tank 11B via a pipe, etc.

In second tank 11B, the fluid that has been subject to the electrochemical treatment in first tank 11A is received, and filtration by filter device 13, which performs filtration using the gel film, is carried out. The details of filter device 13 shall be described with reference to FIG. 4 onwards. Also, since due to the actions of the metal ions that have dissolved from electrodes 12 in first tank 11A, the polymer compounds containing the silica microparticles are formed, the formation of the second filter that is formed of a gel film and the filtration of the silica microparticles and other objects of removal using the second filter are facilitated. The fluid that has been filtered by filter device 13 is discharged out of the system of wastewater treatment device 10A. The filtrated water that is obtained here is filtered to a transmittance of 99.8% or more.

Figure 4B:
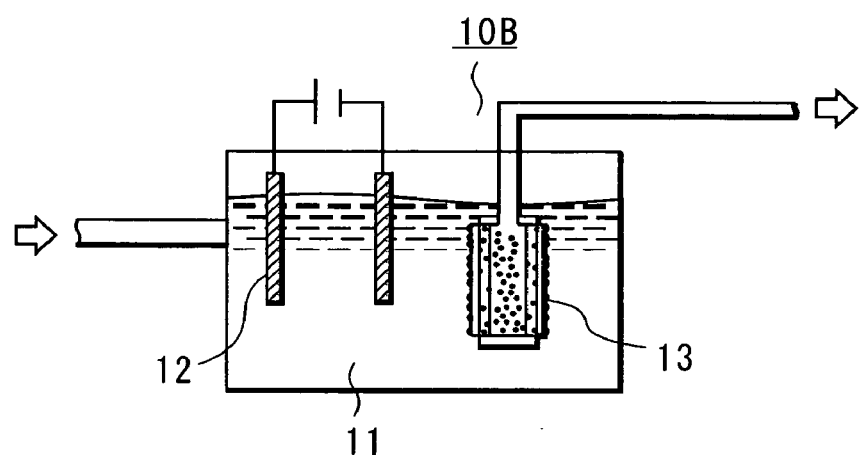
Figure 5:
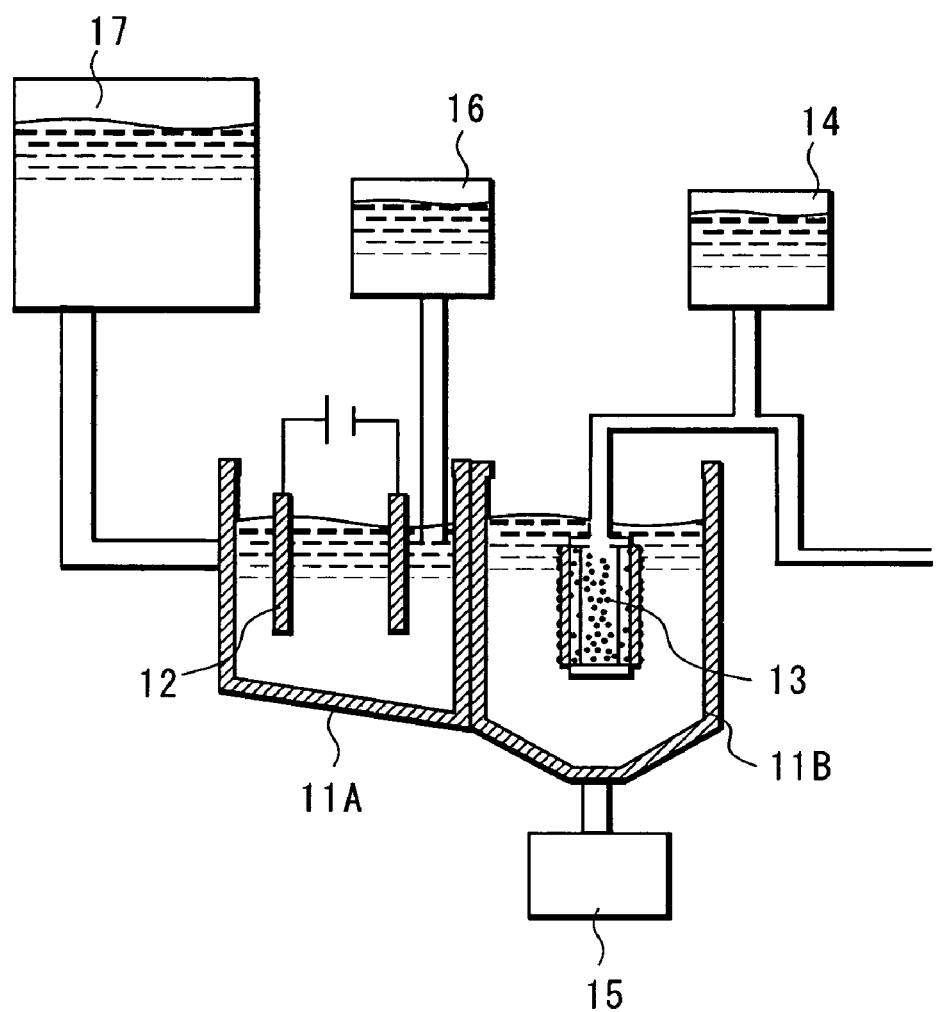
FIG. 5 is a schematic view showing the principles of the electrodes of the water treatment device of this preferred embodiment.

The arrangement, etc. of a wastewater treatment device 10B of another embodiment shall now be described with reference to FIG. 4B. Here, electrodes 12 and filter device 13 are installed in a single tank 11. That is, since electrochemical treatment and filtration of a fluid are carried out in a single tank, a more compact water treatment device can be provided. The arrangement of a more specific wastewater treatment device 10 shall now be described with reference to FIG. 5.

CMP wastewater, discharged from a CMP device, is stored in a wastewater receiving tank 17. The CMP wastewater then flows into first tank 11A via a pipe.

First tank 11A and second tank 11B are formed as a single tank that is partitioned by a partition wall. The fluid that has been treated at first tank 11A is made to flow into second tank 11B via flow-through holes or pipes provided in the partition wall that partitions the two tanks.

At first tank 11A, the wastewater that flows in from receiving tank 17 is stored and by the electrochemical method using electrodes 12, polymer compounds, in which the metal ions that have dissolved from electrodes 12 are bonded to objects of removal, are formed. For example, iron-silica polymer compounds are formed. Since iron-silica polymer compounds have a high coagulation effect such that they are used in themselves as coagulants, coagulates, in which objects of removal besides silica that are contained in the CMP wastewater are coagulated, are formed and the removal of the objects of removal is thereby facilitated.

A promoter, such as sodium chloride or potassium chloride, etc. may in some cases be added from a promoter supply tank 16 to second tank 11B. The electrochemical treatment can thereby be promoted further. The fluid that has been subject to electrochemical treatment at the first tank is transported into the second tank. Nitrogen compounds that are contained in the fluid can also be removed by the electrochemical treatment using electrodes 12.

At second tank 11B, filter device 13, having a self-forming filter formed of a gel film on the surface, is immersed inside the fluid, and the objects of removal contained in the fluid are removed by performing filtration treatment by means of this filter device 13. Since polymer compounds, in which dissolved components of an electrode and objects of removal are bonded, are formed by the electrochemical treatment carried out in first tank 11A, the filtration by filter device 13 can be carried out readily. Also, with the progress of filtration, a gel of the coagulated sol-form microparticles contained in the CMP wastewater sediment at the bottom part of first tank 11A. The sedimented gel is transferred to a gel recovery tank 15. The filtrated fluid is discharged out of the system of wastewater treatment device 10 and is returned to nature or is reused.

Also, iron-silica polymer compounds are formed by the electrochemical treatment by electrodes 12 and the sludge thereof is also collected in gel recovery tank 15. By performing water removal of this sludge, the dried iron-silica polymer compounds that have been dried can be reused as a moisture absorbent or a moisture conditioner.

A part of the filtrated water is stored in a separation water tank 14. Separation water tank 14 is disposed above the water level of the fluid stored in second tank 11B and is used to separate the second filter, formed of a gel film, of filter device 13. Specifically, the separation of the second filter is carried out by the reverse flow of the filtrated water, stored in separation water tank 14, into filter device 13. This separation of the second filter shall be described in detail with reference to FIG. 13.

The specific arrangement of electrodes 12 and the electrochemical treatment of fluid using the electrodes shall now be described with reference to FIG. 6.

Electrodes 12 comprise a first electrode 12A and a second electrode 12B, which are immersed in the fluid, and has a power supply 12C for applying electricity across the electrodes. A control means for controlling these electrodes 12 and a stirring means for stirring fluid W inside the tank can also be provided.

The materials of the first and second electrodes shall now be described in detail with reference to FIG. 6A. First electrode 12A is formed of an element of group 8 of the periodic table or an electric conductor, containing an element of group 8, or a material, with which an element of the same group or an electric conductor containing an element of the same group is coated onto an electric conductor, for example, iron (Fe) or an electrical conductor coated with iron. Though in the present embodiment, iron (Fe) is used as the element of group 8 of the periodic table or electric conductor, containing an element of group 8, or a material, with which an element of the same group or an electric conductor containing an element of the same group is coated onto an electric conductor, cobalt (Co) or nickel (Ni), etc. can be used instead as long as it is an electrical conductor containing an element of group 8 of the periodic table.

Second electrode 12B is formed of a noble metal electrode of, for example, platinum (Pt) or a mixture of platinum and iridium (Ir), etc. or an insoluble electrical conductor onto which such a noble metal is coated. Though second electrode 12B is formed of a noble metal electrode or an insoluble electrical conductor onto which a noble metal is coated, a ferrite-based electrode or other ceramic-based electric conductor, a carbon-based electric conductor, or stainless steel, etc. can be used instead. In the present embodiment, a mixture of platinum and iridium (platinum-iridium) is used.

The actions of the electrochemical treatment using electrodes 12 shall now be described.

Figure 6A:
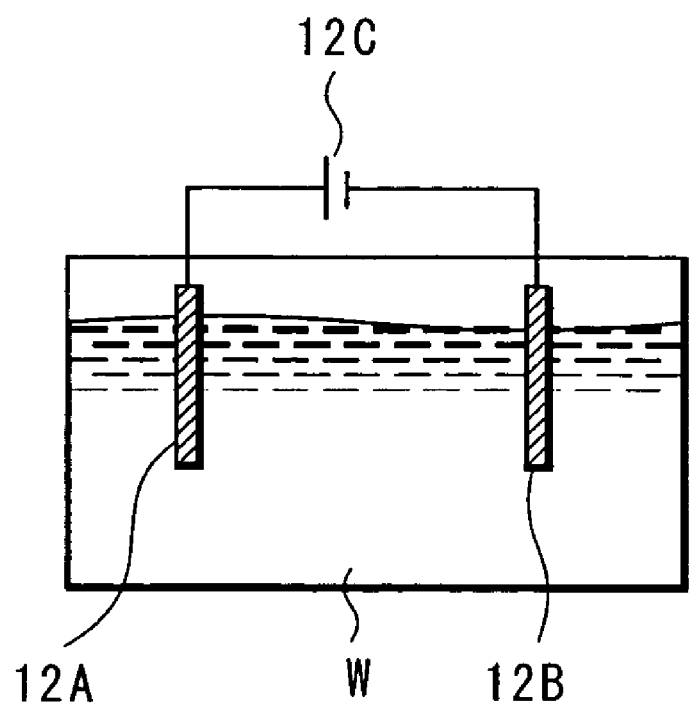
FIG. 6 is a schematic view (A) and a schematic view (B) showing the basic principles of the wastewater treatment device of this preferred embodiment and the wastewater treatment method of this preferred embodiment.

As shown in FIG. 6A, first electrode 12A is connected to the positive terminal of power supply 12C to become the anode electrode and second electrode 12B is connected to the negative terminal of power supply 12C to become the cathode electrode. The fluid is thereby subject to an electrolytic treatment that is the electrochemical method. Since first electrode 12A, which forms the anode, is formed of an electric conductor such as that described above, iron (II) ions elute into the fluid from first electrode 12A and these are oxidized to iron (III) ions in the fluid. These ions then react with silica, which is one of the objects of removal that are contained in the fluid, and iron-silica polymer compounds are thereby formed. Since the polymer compounds, which are iron-silica coagulates, are formed to be larger than the original silica particles, the objects of removal can be removed definitely by filter device 13.

Also, iron-silica polymer compounds act as coagulants in themselves. Furthermore, silica is an object of removal that is contained in the CMP wastewater. Thus by coagulating the iron-silica, the merit of coagulating silica, which is one of the objects of removal, to facilitate the wastewater treatment and the merit of forming iron-silica coagulants are provided. By the forming of the iron-silica coagulants, the abrasive grains and grinding waste besides the silica that are contained in the CMP water can be coagulated to facilitate the filtration treatment.

Figure 6B:
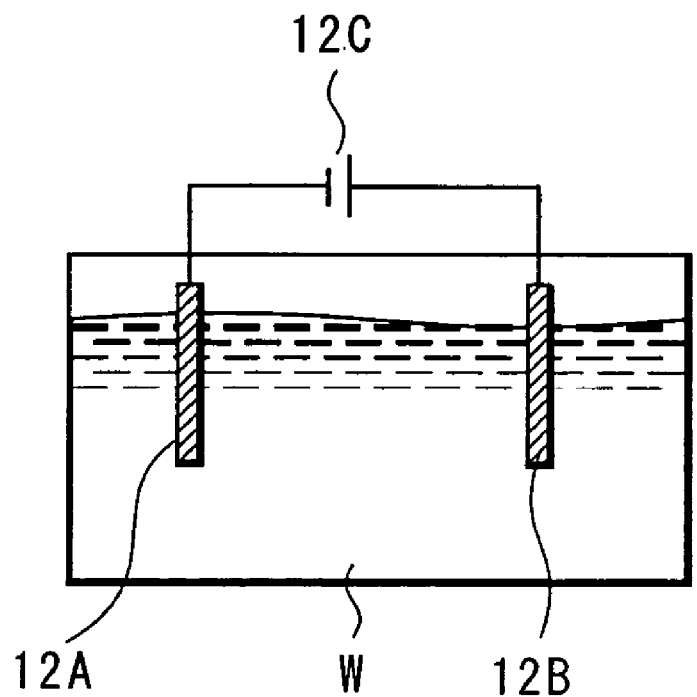

By switching the polarity of first electrode 12A and second electrode 12B as shown in FIG. 6B, the nitrogen components that are contained in the fluid can be removed. Removal from fluids containing ammonia and other nitrogen components can thus be carried out with the same arrangement. The details of removal of the nitrogen components shall now be described.

At the side of first electrode 12A, which forms the cathode, electrons, which have been generated at the side of second electrode 12B, which forms the anode, are supplied and nitrate ions contained in the fluid as nitrate nitrogen are reduced to nitrite ions (reaction A). The nitrate nitrogen that has been reduced to nitrite ions is reduced further to ammonia (ammonium ions) by the supplying of electrons at the side of first electrode 12A, which forms the cathode (reaction B). Reaction A and reaction B are as follows:

Reaction $A$ $NO_3^- + H_2O + 2e^- \rightarrow NO_2^- + 2OH^-$

Reaction $B$ $NO_2^- + 5H_2O + 6e^- \rightarrow NH_3(aq) + 7OH^-$

Meanwhile, at the electrode that forms the anode, chloride ions, which are the halide ions contained in the fluid, release electrons and form chlorine. This chlorine dissolve in water to form hypochlorous acid. Ozone or active oxygen is formed at the same time.

Here, if the concentration of the chloride ions in the fluid is low, halide ions, such as chloride ions, iodide ions, bromide ions, etc., or a compound containing such a halide ion, such as sodium chloride, potassium chloride, etc., can be added into the fluid. Preferably, the amount of chloride ions of the sodium chloride in the fluid is set, for example, to no less than 10 ppm and no more than 40000 ppm.

Such chloride ions that are inherently contained in the fluid and the sodium chloride that have been added as described above are oxidized at the electrode that forms the anode and chlorine is generated (reaction C; the reaction in the case of sodium chloride is indicated), and the generated chlorine reacts with the water in the fluid to generate hypochlorous acid (reaction D). The generated hypochlorous acid then reacts with the ammonia (ammonium ion) that has been generated in the fluid by the abovementioned reaction B and, after a plurality of chemical changes, is converted into nitrogen gas (reaction E). The reactions C through reaction E are as follows:

Reaction $C$ $NaCl \rightarrow Na^+ + Cl^-$ $2Cl^- \rightarrow Cl_2 + 2e^-$

Reaction $D$ $Cl_2 + H_2O \rightarrow HClO + HCl$

Reaction $E$ $NH_3 + HClO \rightarrow NH_2Cl + H_2O$ $NH_2Cl + HClO \rightarrow NHCl_2 + H_2O$ $NH_2Cl + NHCl_2 \rightarrow N_2\uparrow + 3HCl$ The ammonia (ammonium ion) in the fluid also reacts with the ozone or the active oxygen that is generated at the side of second electrode 12B, which forms the anode, as shown by reaction F and is denitrified to nitrogen gas by this reaction as well.

Reaction $F$ $2NH_3(aq) + 3(O) \rightarrow N_2\uparrow + 3H_2O$

The nitrate nitrogen, nitrite nitrogen, ammonia nitrogen, and other nitrogen compounds in the fluid can thus be treated.

Fourth Embodiment

In this embodiment, the filter device 13 shall now be described in outline with reference to FIG. 7 and after FIG. 7.

This preferred embodiment is a method of removal by a filter for objects of removal, mixed in the form of a colloidal solution (sol) in a fluid (wastewater), by means of a gel film formed from the objects of removal.

To be more specific, a gel film, which is to be formed as a second filter 2 from the CMP slurry that is the colloidal solution containing the objects of removal, is formed on the surface of an organic-polymer-based first filter 1, and these filters 1 and 2 are immersed in a fluid 3 inside a tank in order to filter wastewater containing the objects of removal.

In principle, as first filter 1, either an organic-polymer-based filter or a ceramic-based filter can be used as long as the gel film can be attached. Here, a polyolefin-based polymer film with an average pore diameter of 0.25 μm and thickness of 0.1 mm was employed. A photographic image of the surface of this polyolefin-based filter film is shown in FIG. 8B.

First filter 1 has the structure of a flat film disposed on both sides of a frame 4 and is immersed vertically into the fluid, and filtrate 7 is arranged to be taken out from a hollow part 5 of frame 4 by suction by means of a pump 6.

Second filter 2 is a gel film, which is attached to the entire surface of first filter 1 and is formed by suction and gelation of the sol of the objects of removal. Since a gel film has a jelly-like form, it is generally considered as not having the function of a filter. However, with the preferred embodiment, this gel film can be made to have the function of second filter 2 by selection of the gel film forming conditions. These forming conditions shall be described in detail later.

The forming of second filter 2, which is a gel film of the objects of removal, from the above-described colloidal solution (sol) of the objects of removal and the filtration by which the objects of removal are removed, shall now be described with reference to FIGS. 7 and 8A.

1 indicates the first filter and 1A indicates filter pores. The film that is formed as layers at the openings of filter pores 1A filter pores 1A and on the surface of first filter 1 is the gel film of the objects of removal 13. The objects of removal 13 are sucked in via first filter 1 by the suction pressure from a pump, and due to the drying (dehydration) of fluid 3 by the sucking away of the water content, the particles of the objects of removal in the colloidal solution gels and binds, thereby forming on the surface of first filter 1 a large gel film that cannot pass through filter pores 1A filter pores 1A. This gel film forms second filter 2.

When the film thickness of second filter 2 reaches a certain thickness, gaps that do not allow passage of the gel of the objects of removal are formed in second filter 2, and filtration of the objects of removal in the colloidal solution by use of this second filter 2 is thereby started. Thus as filtration is continued while performing suction by pump 6, the gel film on second filter 2 gradually becomes layered and thick, and eventually, second filter 2 becomes clogged, thereby preventing further filtration. In this process, the colloidal solution of the objects of removal attaches onto the surface of second filter 2 while gelling and the water of the colloidal solution passes through first filter 1 and is taken out as filtrated water.

Figure 8A:
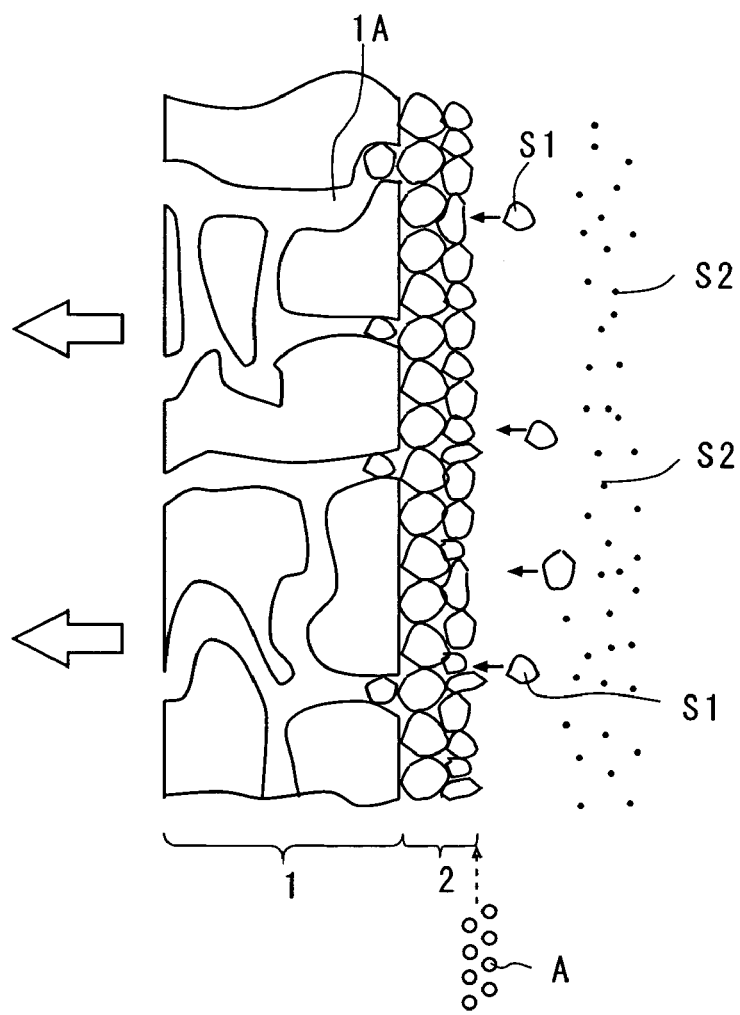
FIG. 8 is a diagram showing the operating principles of a filter device (A) of this preferred embodiment and an enlarged view of the first filter (B).
Figure 8B:
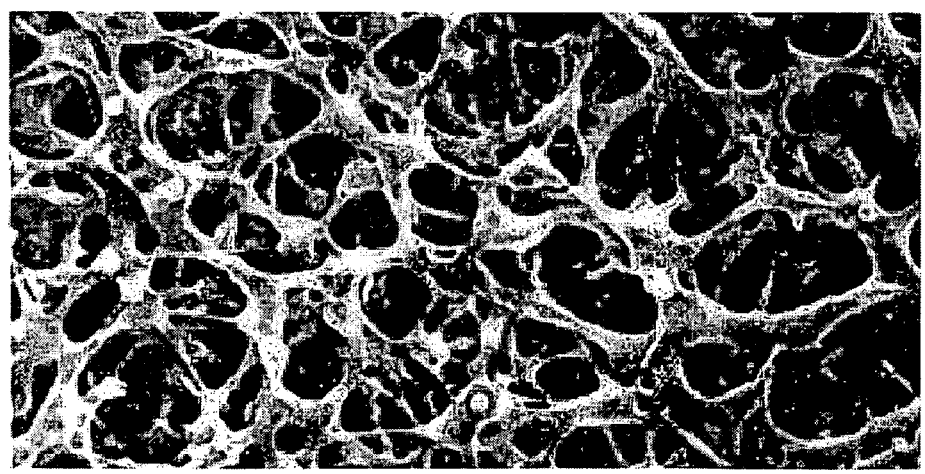

In FIG. 8A, wastewater, in the form of a colloidal solution having the objects of removal mixed therein, exists at one side of first filter 1, and filtrated water that has passed through first filter 1 is produced at the opposite side of first filter 1. The wastewater is sucked and made to flow in the direction of the arrow, and as the microparticles in the colloidal solution are made to approach first filter 1 by the suction, the microparticles lose their electrostatic repulsive force and are made to gel, and a gel film, resulting from the binding of several microparticles, become adsorbed onto the surface of first filter 1, thereby forming second filter 2. By the action of this second filter 2, filtration of the wastewater is carried out as the objects of removal in the colloidal solution while being gelled. Filtrated water is sucked from the opposite side of first filter 1.

By thus slowly sucking the colloidal solution wastewater via second filter 2, the water in the wastewater is taken out as filtrated water and the objects of removal gel upon drying and become layered and captured as the gel film on the surface of second filter 2.

The conditions for forming second filter 2 shall now be described with reference to FIG. 9. FIG. 9 shows the forming conditions and the filtration amount of second filter 2.

The method of this preferred embodiment comprises the processes of forming second filter 2 and filtering. The filtration rate of purified water in the filtration process differs greatly with the conditions for forming of second filter 2, and, it becomes clear that unless the conditions for forming second filter 2 are not selected appropriately, filtration by second filter 2, which is a gel film, can hardly be performed. This is in agreement with the fact that it had priorly been said that the filtration of a colloidal solution is impossible.

Figure 9A:
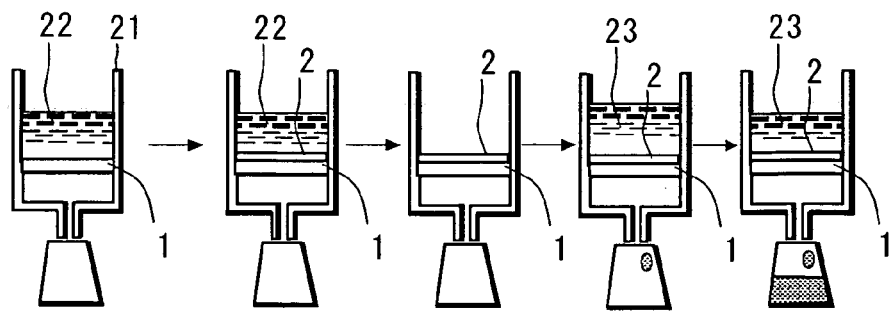
FIG. 9 is a sectional view (A) and a characteristics diagram (B) showing the film forming conditions of a second filter device of this preferred embodiment.
Figure 9B:
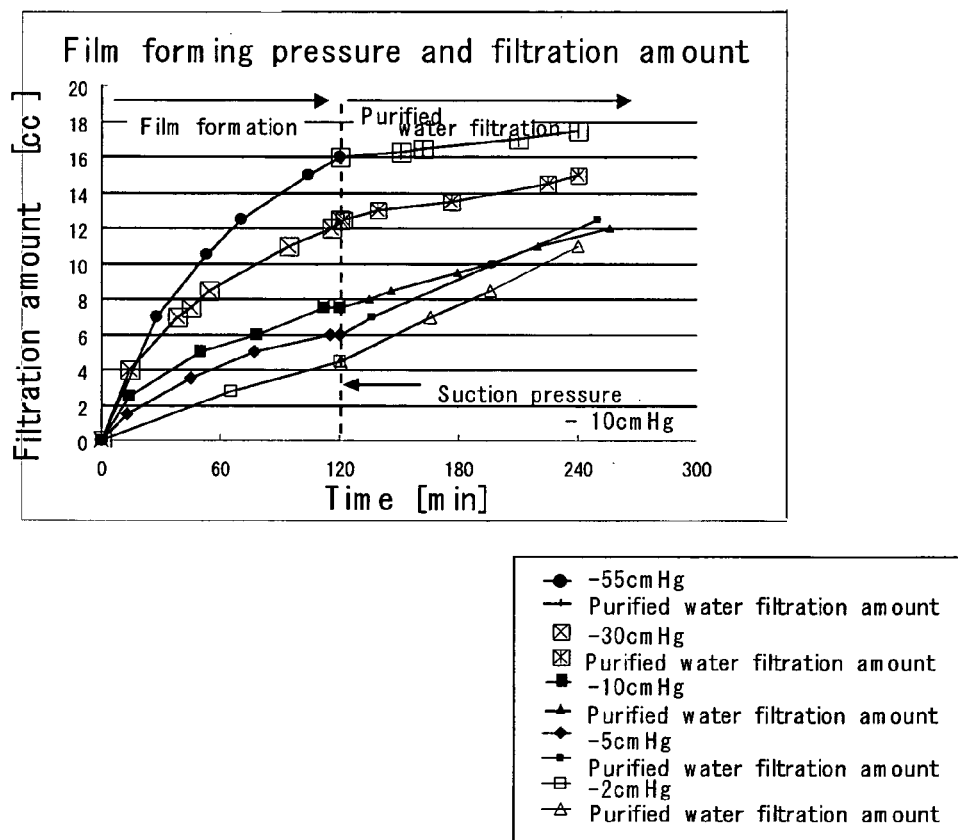

The characteristics shown in FIG. 9B were determined by experiments performed according to the method illustrated in FIG. 9A. That is, first filter 1 is disposed at the bottom of a cylindrical container 21, 50 cc of the raw fluid of W2000 tungsten abrasion slurry 22, made by Cabot Corp., are placed inside the container, and the formation of a gel film is carried out at various suction pressures. The remaining slurry 22 is subsequently thrown out, 10 cc of purified water 23 is placed in the container, and filtration is performed at an extremely low suction pressure. The filtration characteristics of the gel film that is to be second filter 2 can thus be examined. The first filter 1 used here had a diameter of 47 mm and an area of 1734 mm².

As shown in FIG. 9B, for the gel film forming process, the suction pressure was set at the various values of −55 cmHg, −30 cmHg, −10 cmHg, −5 cmHg, and −2 cmHg, and film forming was carried out for 120 minutes, after which the properties of the gel film were examined. As a result, it was found that the filtration amount was highest at 16 cc at 2 hours when the suction pressure was set to a strong pressure of −55 cmHg, and decreased in the order of 12.5 cc, 7.5 cc, 6 cc, and 4.5 cc.

Replacement by purified water is then carried out and filtration by the gel film is performed. At this point, the suction pressure is set to a fixed level of −10 cmmHg. With the gel film formed at a suction pressure −55 cmHg, a filtration rate of only 0.75 cc/hour could be achieved. The filtration rate of the gel film formed at a suction pressure of −30 cmHg was approximately 1 cc/hour. However, with a gel film formed at a suction pressure of −10 cmHg, the filtration rate was 2.25 cc/hour, with a gel film formed at a suction pressure of −5 cmHg, the filtration rate was 3.25 cc/hour, and with a gel film formed at a suction pressure of −2 cmHg, the filtration rate was 3.1 cc/hour, thus showing that with a gel film that is formed at an extremely weak suction pressure, stable filtration can be performed in the filtration process. These experimental results clearly show that by setting the suction pressure to a level at which the filtration rate will be approximately 3 cc/hour in the process of forming the gel film of second filter 2, the filtration rate in the subsequent filtration process will be maximized.

The reason for the above results is considered to be because when the suction pressure is high, the gel film that is formed becomes low in the degree of swelling and thus dense and hard. The gel film is thus formed in a contracted state of low water content in which there are hardly any paths for the permeation of purified water.

On the other hand, when the suction pressure is made weak, the gel film that is formed becomes high in the degree of swelling and thus low in density and soft. The gel film is thus formed in a swollen state of high water content, thus enabling many paths for the permeation of purified water to be secured. This can be readily understood by an analogy to a gradual accumulation of powdery snow. An advantage of the preferred embodiment is that a gel film of a high degree of swelling, which has been formed at a weak suction pressure, is used to realize filtration that makes of use of the permeation of water through this gel film.

FIG. 8A show one side of the filter of FIG. 1 and is actually a schematic view that illustrates how the gel film becomes attached.

First filter 1 is immersed in a vertically upright manner in a colloidal solution wastewater, and the wastewater is a colloidal solution in which objects of removal 13 are dispersed. Objects of removal 13 are indicated by small black circles. When the wastewater is sucked through first filter 1 at a weak suction pressure by means of pump 6, the microparticles of the objects of removal gel as they approach first filter 1 and become adsorbed onto the surface of first filter 1. Of the gelled microparticles S1, indicated by white circles, those that are larger than the filter pores 1A filter pores 1A of first filter 1 gradually become adsorbed and layered on the surface of first filter 1, thereby forming second filter 2 comprising a gel film. Though gelled microparticles SI that are smaller in diameter than filter pores 1A pass through first filter 1, they do not present a problem since in the process of forming second filter 2, the filtrated water is circulated back to the wastewater. Second filter 2 is thus formed over a period of approximately 120 minutes as mentioned above. In this film forming process, since suction at an extremely weak suction pressure is performed, the gelled microparticles S1 are layered while forming gaps of various shapes, thereby forming second filter 2 as a soft gel film of extremely high degree of swelling. The water in the wastewater is sucked and made to permeate through this gel film of high degree of swelling and pass through first filter 1 to be taken out as filtrated water, and the wastewater is thus filtrated in the final stage.

That is, with this preferred embodiment, second filter 2 is formed as a gel film of a high degree of swelling, and by repeating the contraction of the gel film by dehydration of the water contained in the gel film in contact with first filter 1 by suction at a weak suction pressure from the first filter 1 side and the swelling of this gel film by causing water to permeate and be replenished from the gel film in contact with the wastewater, just the water is made to permeate and be filtrated through second filter 2.

Also, air bubbles 12 are sent up to first filter 1 from the bottom of the wastewater to form a parallel flow of wastewater along the surface of first filter 1. This is for making second filter 2 become attached uniformly over the entire surface of first filter 1 and to make second filter 2 become attached softly while forming gaps. Though to be more specific, the air flow rate is set to 1.8 liters/minute, this flow rate is selected according to the film quality of second filter 2.

In the subsequent filtration process, the gelled microparticles S1, indicated by white circles, are made to become adsorbed and gradually layered on the surface of second filter 2 by the weak suction pressure. In this process, purified water permeates through second filter 2 and the gelled microparticles S1, which are indicated by white circles and become layered further, and is taken out from first filter 1 as filtrated water. That is in the case of CMP, abrasive grains of silica, alumina, or ceria, etc., and processing waste, such as semiconductor waste, metal waste, and/or insulating film material waste that are produced by abrasion by the abrasive grains, become layered and captured as gel on the surface of second filter 2 and the water permeates through the gel film and can be taken out as filtrated water from first filter 1.

However, as shown in FIG. 9B, when filtration is continued over a long period of time, the gel film becomes attached thickly onto the surface of second filter 2, causing clogging and disabling the taking out of filtrated water. Thus in order to regenerate the filtration ability, the layered gel film must be removed.

A more specific filtration device shall now be described with reference to FIG. 10.

Figure 10:
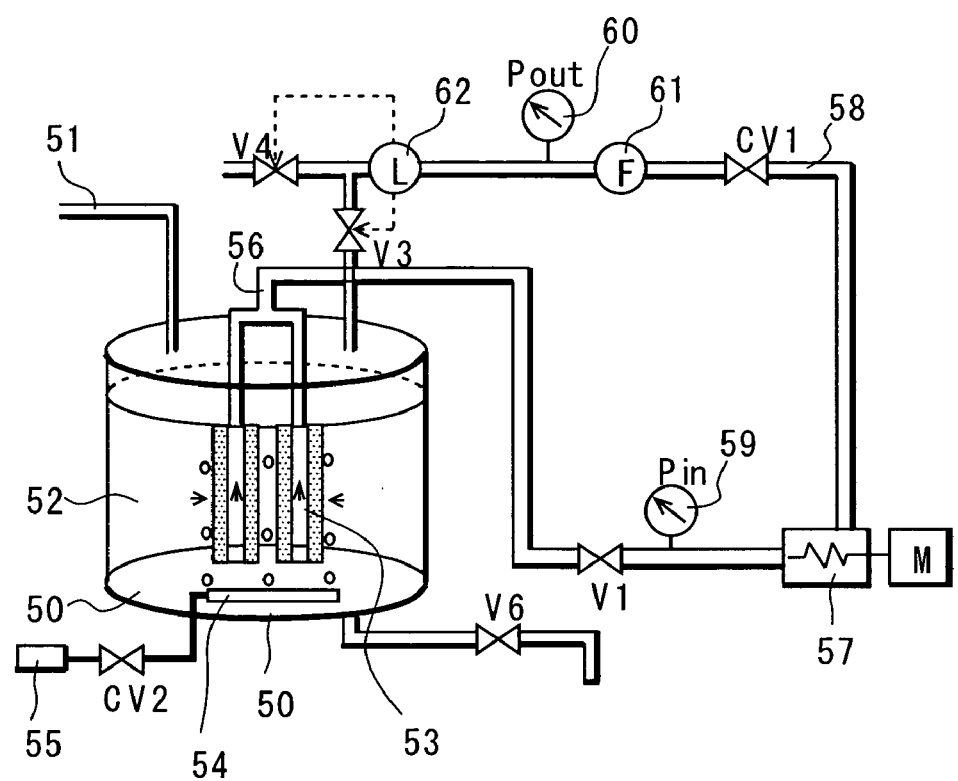
FIG. 10 is a schematic view showing a specific filter device of this invention.

In FIG. 10, 50 indicates a raw water tank. A pipe 51 is disposed above tank 50 as a wastewater supply means, and fluid having objects of removal mixed therein flows through this pipe 51. For example in the semiconductor industry, wastewater (i.e., raw water), having objects of removal mixed therein and flows out from a dicing machine, backgrinding machine, mirror-polishing machine, or CMP machine, passes through pipe 51. In the following description, the wastewater shall correspond to wastewater in which are mixed abrasive grains flowing out from a CMP machine and grinding or abrasive waste originating from abrasive grains.

A plurality of filtration units 53, each having a second filter formed therein, are disposed in raw water 52 stored in raw water tank 50. An aeration pipe 54, such as that of a bubbling device used in an aquarium and made for example by opening small holes in a pipe, is disposed below filtration units 53 and positioned so that air bubbles pass by the surface of filtration unit 53. This aeration pipe 54 is disposed across the entire bottom side of filtration unit 53 to enable air bubbles to be supplied uniformly across the entire surface of filtration unit 53. 55 is an air pump. Here, filtration unit 53 refers to first filter 1, frame 4, hollow part 5, and second filter 2 shown in FIG. 7.

Figure 7:
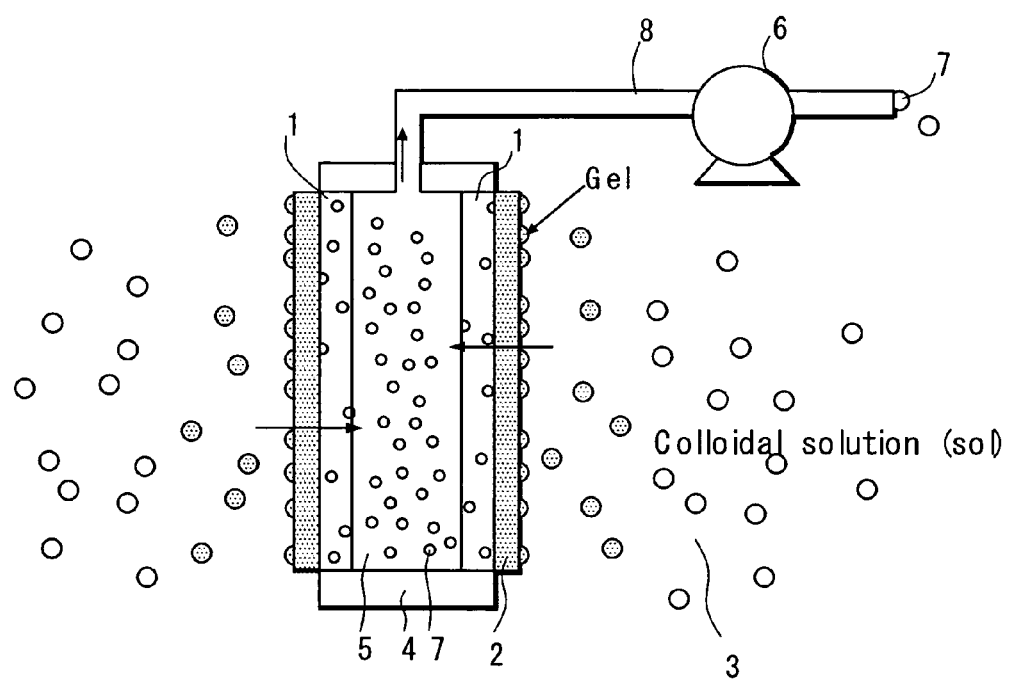
FIG. 7 is a schematic view showing the filter device of the water treatment device of this preferred embodiment.

A pipe 56, fixed to filtration unit 53, corresponds to pipe 8 shown in FIG. 7. The fluid filtrated through filtration unit 53 flows through this pipe 56, which is connected via a valve V1 to a magnetic pump 57, which performs suction. A pipe 58 is connected from magnetic pump 57 and to valve V3 and valve 4 via control valve CV1. Also a first pressure gauge 59 is provided subsequent pipe 56 and measures the suction pressure Pin. Furthermore a flow meter F and a second pressure gauge 60 are disposed subsequent control valve CV1 of pipe 58 and control is performed to maintain a fixed flow rate at flow meter 61. The flow rate of air from air pump 55 is controlled by a control valve CV2.

Raw water 52, supplied from pipe 51, is stored in raw water tank 50 and is filtrated by filtration unit 53. Air bubbles pass by the surface of second filter 2 attached to the filtration unit, and a parallel flow, generated by the ascending force and rupturing of air bubbles, causes the gelled objects of removal that adsorb onto second filter 2 to move and become adsorbed uniformly across the entire surface of filtration unit 53, thereby maintaining the filtration capability and preventing it from deteriorating.

The above-described filtration unit 53, more specifically, the filtration unit 53 that is immersed inside raw water tank 50 shall now be described with reference to FIGS. 11 and 12.

Figure 11A:
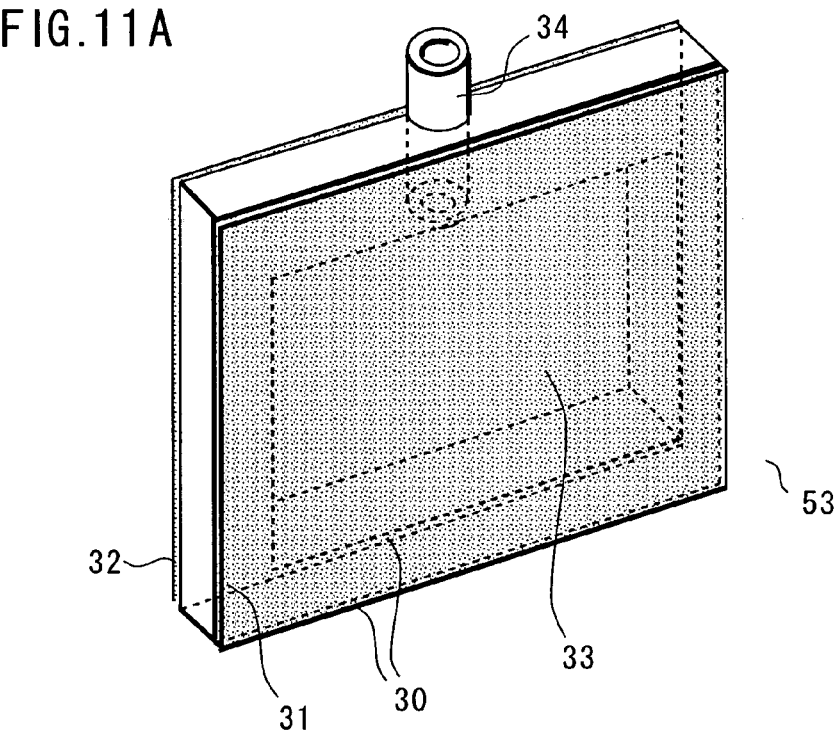
FIG. 11 is a perspective view (A), a perspective view (B), and a perspective view (C) showing the filter device of this preferred embodiment.

Reference symbol 30 in FIG. 11A indicates a frame, having the shape of a picture frame, and this corresponds to frame 4 of FIG. 7. Filter films 31 and 32, which are to become first filter 1 (FIG. 7) are adhered and fixed onto both sides of frame 30. Filtration by filter films 31 and 32 is accomplished by applying suction, via a pipe 34 (corresponding to pipe 8 of FIG. 7), to an inner space 33 (corresponding to hollow part 5 of FIG. 7), which is surrounded by frame 30 and filter films 31 and 32. Filtrated water is taken out via pipe 34 that is mounted in a sealed manner to frame 30. Needless to say, filter films 31 and 32 and frame 30 are sealed completely so as to prevent entry of wastewater into the abovementioned space 33 from parts besides the filter films.

Since filter films 31 and 32 of FIG. 11A are thin resin films, they warp inwards when suction is applied and may rupture in some cases. Though this space must thus be made as small as possible, in order to make the filtration capability high, space 33 must be formed to be as large as possible. This is resolved as shown in FIG. 11B. Though only nine spaces 33 are shown in FIG. 11B, many more are formed in actuality. Also, the actually employed filter film 31 is a polyolefin-based polymer film with a thickness of approximately 0.1 mm and the thin filter film is formed to have a bag-like form as shown in FIG. 11B and is indicated as FT in FIG. 11B. Frame 30, with an integral pipe 34, is inserted inside this bag-like filter FT and the abovementioned frame 30 and the abovementioned filter FT are adhered together. Reference symbol RG indicates a presser means which presses the frame to which filter FT has been adhered from both sides. Filter FT is exposed from an opening OP of the presser means. Details shall be described again with reference to FIG. 12.

Figure 11C:
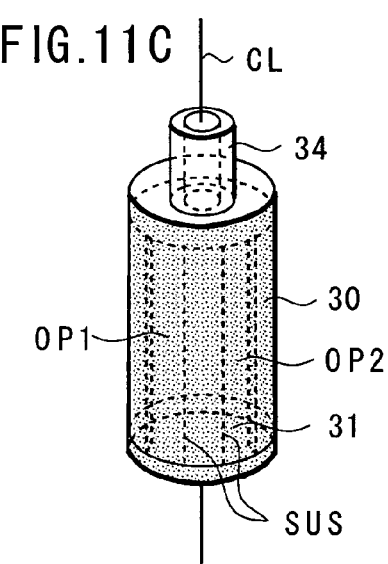
Figure 11B:
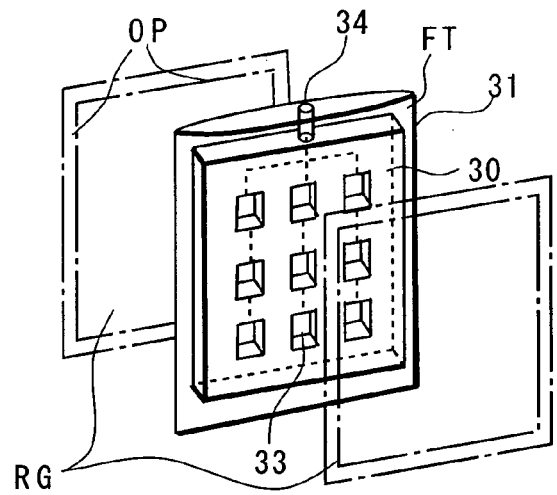

FIG. 11C shows an arrangement wherein filtration unit 53 itself is formed to have a cylindrical shape. A frame, mounted to pipe 34, is cylindrical in form and has openings OP1 and OP2 provided at its side face. Since side face parts corresponding to openings OP1 and OP2 are removed, a supporting means SUS, which supports filter film 31 is provided between the openings. Filter film 31 is adhered to the side face.

Filtration unit 53 shall now be described further with reference to FIG. 12.

First, a part 30a, corresponding to frame 30 of FIG. 11B, shall be described with reference to FIGS. 12A and 12B. In appearance, part 30a is formed to have a shape similar to corrugated cardboard. Thin resin sheets SHT1 and SHT2, each with a thickness of approximately 0.2 mm, are overlapped and a plurality of sections SC in the vertical direction are provided in between the sheets, thereby forming spaces 33 surrounded by resin sheets SHT1 and SHT2 and sections SC. Each space 33 has a rectangular cross section with a length of 3 mm and width of 4 mm, and put in another way, the arrangement has a shape formed by aligning and integrating a number straws with such a rectangular cross section. Part 30a maintains the filter films FT at both sides at a fixed interval with respect to each other and shall thus be referred to hereinafter as a "spacer."

Numerous holes HL of 1 mm diameter are formed on the surfaces of the thin resin sheets SHT1 and SHT2 that make up spacer 30a, and filter films FT are adhered onto these surfaces. The filtrated water that is filtrated by filter films FT thus passes through holes HL and space 33 and finally flows out via pipe 34.

Filter films FT are adhered onto both surfaces SHT1 and SHT2 of spacer 30a. The surfaces SHT1 and SHT2 of spacer 30a have parts in which holes HL are not formed, and when parts of filter film FT1 are adhered directly onto such parts, since the parts of filter FT1 corresponding to parts where holes HL are not formed have no filtration capability and do not allow passage of wastewater, parts arise at which the objects of removal will not be captured. In order to prevent this phenomenon, at least two filter films FT are adhered together. The filter film FT1 at the outermost side is the filter film that captures the objects of removal, and as the surface SHT1 of spacer 30a is approached from the side of filter film FT1, filter films with pores greater than the pores of filter film FT1 are provided, and in the present case, one such filter film FT2 is adhered. Since filter film FT2 is thus provided in between even at parts at which holes HL of spacer 30a are not formed, the entire surface of filter film FT1 is made to exhibit a filtration function, the objects of removal are captured over the entire surface of filter film FT1, and the second filter film is formed over the entire surfaces of the front and rear surfaces FT1 and FT2. Also, though filter films FT1 and FT2 are shown as rectangular sheets due to reasons of illustration, they are actually formed to have bag-like shapes.

The manner in which the bag-like filters FT1 and FT2, spacer 30a, and presser means RG are mounted shall now be described with reference to FIGS. 12A, 12C, and 12D.

Figure 12A:
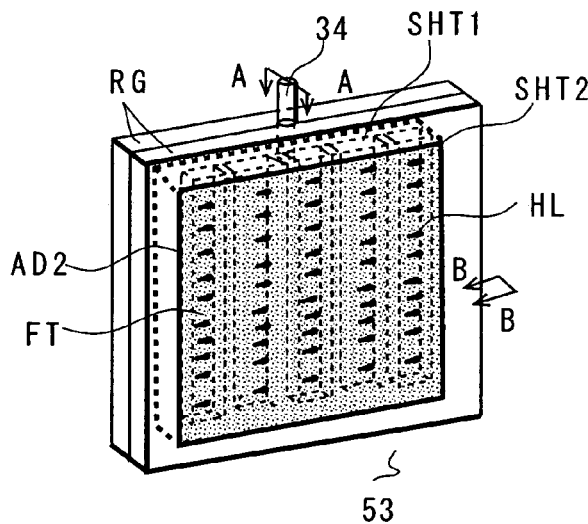
FIG. 12 is a perspective view (A), a perspective view (B), a sectional view (C), and a sectional view (D) showing a more specific filter device of this invention.
Figure 12D:
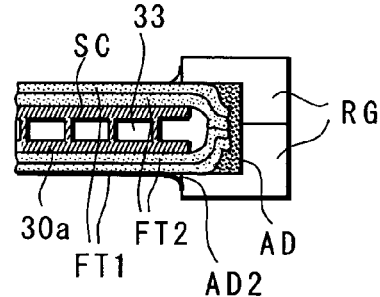
Figures 12B, 12C:
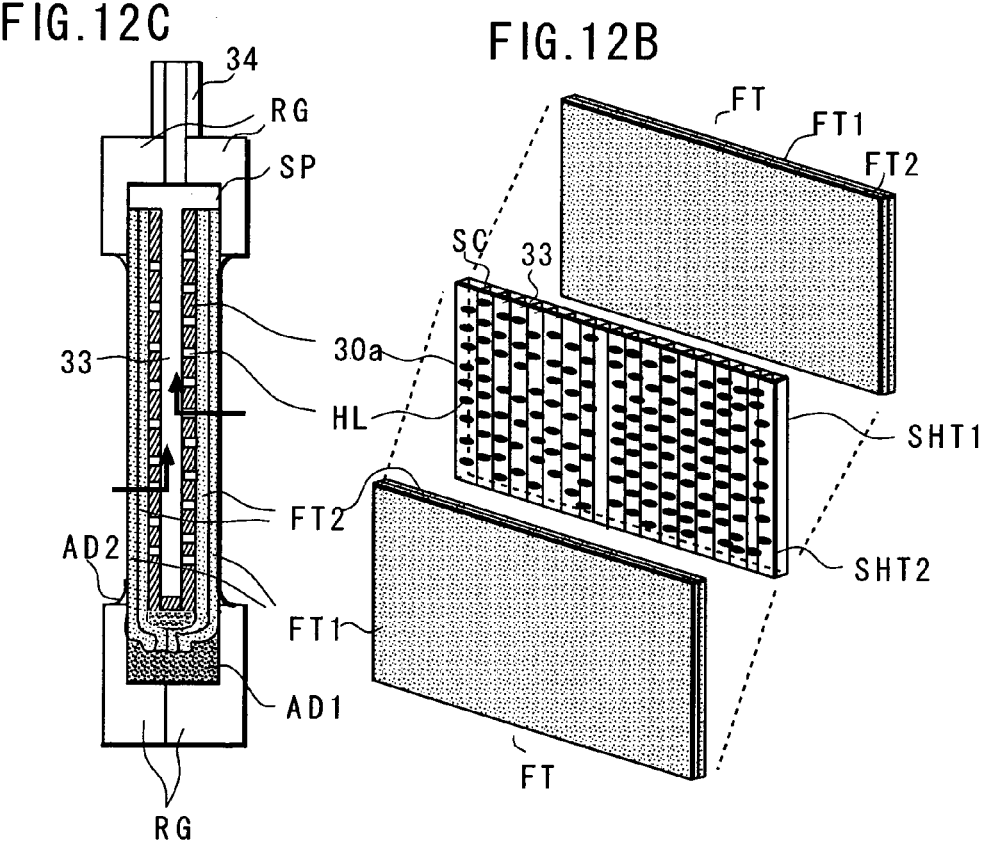

FIG. 12A is a completion diagram, FIG. 12C is a sectional view such obtained by sectioning along the direction of extension (vertical direction) of pipe 34 from the head part of pipe 34 as indicated by line A—A of FIG. 12A, and FIG. 12D is a sectional view obtained by sectioning filtration unit 35 in the horizontal direction as indicated by line B—B.

As can be understood from FIGS. 12A, 12C, and 12D, spacer 30a, which is inserted inside bag-like filter film FT, has its four sides sandwiched, along with filter film FT, by presser means RG. The three sides that are closed in bag-like manner and the remaining one side are fixed by adhesive agent AD1 applied to presser means RG. Also, a space SP is formed between the remaining ones side (the opening of the bag) and presser means RG, and the filtrated water that is produced in space 33 is sucked into pipe 34 via this space SP.

Also, an adhesive agent AD2 is applied along the entire periphery of openings OP of presser means RG, thereby completely sealing these openings and providing a structure with which fluid cannot enter inside from parts besides the filter.

Space 33 and pipe 34 are thus in communication, thus providing a structure wherein, when suction is applied from pipe 34, fluid flows towards space 33 through the pores of filter film FT and the holes HL of spacer 30a and filtrated water is transported from space 33 to the exterior via pipe 34.

The structure shown in FIG. 11 is employed for the filtration unit 53 used here, and the frame (presser means RG) to which the filter film is to be mounted has the size of A4 paper, and to be more specific, is approximately 19 cm in length, approximately 28.8 cm in width, and 5 to 10 mm in thickness. Since filtration unit 53 is actually provided at both sides of the frame, the area will be double that obtained from the above dimensions (i.e., an area of 0.109 cm$^2$). However, the number and sizes of the filtration units can be selected freely according to the size of raw water tank 50 and is determined by the required filtration rate.

An actual filtration method using the filtration unit shown in FIG. 10 shall now be described more specifically.

First, wastewater, in which objects of removal are mixed in the form of a colloidal solution, is placed in raw water tank 50 via pipe 51. A filtration unit 53, which has just first filter 1 and does not have second filter 2 formed therein, is then immersed in this tank 50 and wastewater is circulated by sucking via pipe 56 at a weak suction pressure by means of pump 57. The circulation path passes through filtration unit 53, pipe 56, valve V1, pump 57, pipe 58, control valve CV1, flow meter 61, optical sensor 62, and valve 63, and the wastewater is thus sucked in from tank 50 and returned to tank 50.

By this circulation, second filter 2 is formed on first filter 1 (31 in FIG. 11) of filtration unit 53, and in the final stage, the intended objects of removal in the colloidal solution become captured.

That is, when the wastewater is sucked through first filter 1 at a weak suction pressure by means of pump 57, the microparticles of the objects of removal gel as they approach first filter 1 and become adsorbed onto the surface of first filter 1. Of the gelled microparticles, those that are larger than the filter pores 1A of first filter 1 become adsorbed and layered gradually on the surface of first filter 1, thereby forming second filter 2, comprising a gel film. Though the gelled microparticles of diameter smaller than filter pores 1A pass through first filter 1, as second filter 2 is formed, the water in the wastewater comes to be sucked upon permeation through the gel film and taken out as filtrated water through first filter 1 and the wastewater is thus filtrated.

The concentration of microparticles contained in the filtrated water is monitored by optical sensor 62, and filtration is started upon confirming that the amount of microparticles is lower than a desired mixing proportion. When filtration is to be started, valve V3 is closed in accordance with a detection signal from optical sensor 62 and valve V4 is opened, thereby shutting off the abovementioned circulation path. Purified water is thus taken out from valve V4. Air bubbles, which are supplied constantly from air pump 55, are supplied from aeration pipe 54 to the surface of filtration unit 53 upon being regulated by control valve CV2.

As continuous filtration is continued, the water in the wastewater in raw water tank 50 is taken out of tank 50 as filtrated water, and the concentration of the objects to be removed in the wastewater thus increases. That is, the colloidal solution is concentrated and increased in viscosity. Wastewater is thus replenished into raw water tank 50 from pipe 51 to restrain the rise of concentration of wastewater and improve the efficiency of filtration. However, as a gel film attaches thickly onto the surface of second filter 2 of filtration unit 53, second filter 2 becomes clogged and a state wherein filtration cannot be performed is entered eventually.

When clogging of second filter 2 of filtration unit 53 occurs, regeneration of the filtration capability of second filter 2 is carried out. That is, pump 57 is stopped and the negative suction pressure that is applied to filtration unit 53 is eliminated.

Figure 13A:
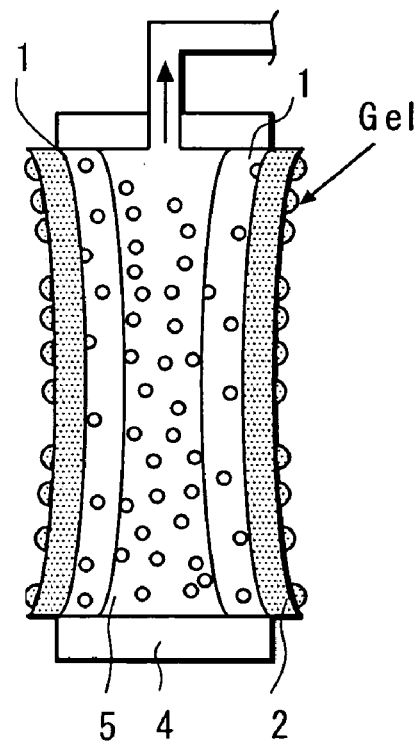
FIG. 13 is a sectional view (A) and a sectional view (B) showing the regeneration of the filter device of this preferred embodiment.
Figure 13B:
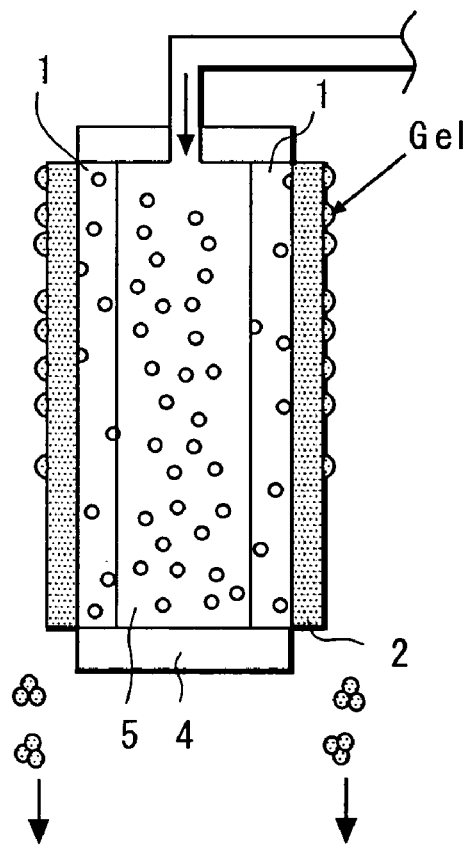

This regeneration process shall now be described in detail with reference to a schematic drawing shown in FIG. 13. FIG. 13A shows the condition of filtration unit 53 during the filtration process. Since hollow part 5 of first filter 1 is set at a negative pressure in comparison to the outer side due to the weak suction pressure, first filter 1 takes on a shape that is concave towards the inner side. Second filter 2, which is adsorbed on the surface of first filter 1, thus takes on a similar, inwardly-concave shape. The same applies to the gel film that is gradually adsorbed onto the surface of second filter 2.

In the regeneration process, since the weak suction pressure is stopped and the pressure returns substantially to atmospheric pressure, first filter 1 of filtration unit 53 returns to its original state. Second filter 2 and the gel film adsorbed to its surface likewise return to their original state. Consequently, since the suction pressure that had caused adsorption of the gel film is first of all eliminated, the gel film loses the force of adsorption onto filtration unit 53 and, at the same time, receives an outwardly expanding force. The adsorbed gel film thus begins to separate from filtration unit 53 due to its own weight. It is furthermore preferable to increase the amount of air bubbles from aeration pipe 54 by approximately two times in order to promote this separation. Experiments have shown that the separation begins from the lower end of filtration unit 53 and then the gel film of second filter 2 on the surface of first filter 1 separates in an avalanche-like manner and settles to the bottom of raw water tank 50. Thereafter, second filter 2 can be formed again by circulating wastewater along the above-described circulation path. In this regeneration process, second filter 2 returns to its original state and when it has been revived to the state enabling filtration of wastewater, the filtration of wastewater is carried out again.

Furthermore, when filtrated water is made to flow in reverse into hollow part 5 in this regeneration process, firstly, the return of first filter 1 to its original state is aided and the application of the hydrostatic pressure of the filtrated water applies an outwardly swelling force, and secondly, the filtrated water passes through the filter pores 1A from the inner side of first filter 1 and seeps into the boundary between first filter 1 and second filter 2 to promote the separation of the gel film of second filter 2 from the surface of first filter 1.

As mentioned above, as filtration is continued while regenerating second filter 2, the concentration of the objects of removal in the wastewater in raw water tank 50 increases and the wastewater comes to have a considerable viscosity. Thus when the concentration of the objects of removal in the wastewater exceeds a predetermined concentration, the filtration operation is stopped and the system is left still for sedimentation. Concentrated slurry thus collects at the bottom of tank 50 and this gel-like concentrated slurry is recovered by opening valve 64. The recovered concentrated slurry is compressed or dried by heating to remove the water contained therein and thereby further reduce its weight. The amount of slurry to be handled as industrial weight can thereby be reduced significantly.

The operation conditions of the filtration unit shown in FIG. 10 shall now be described with reference to FIG. 14. The operation conditions are those for the case where both surfaces (area: 0.109 m$^2$) of the above-described single filtration unit 53 of A4 size are used. The initial flow rate is set at 3 cc/hour (0.08 m$^3$/day), at which the filtration efficiency is good as was mentioned above, and the post-regeneration flow rate is set to this value as well. The air blow rate is set to 1.8 L/minute during film formation and filtration and to 3 L/minute during regeneration. "Pin" and "Regeneration Pin" are suction pressures and are measured by pressure gauge 59. "Pout" and "Regeneration Pout" are pressures at pipe 58 and are measured by pressure gauge 60. The flow rate and regeneration flow rate are measured by flow meter 61 and express the rate of filtration by suction from filtration unit 53.

Figure 14:
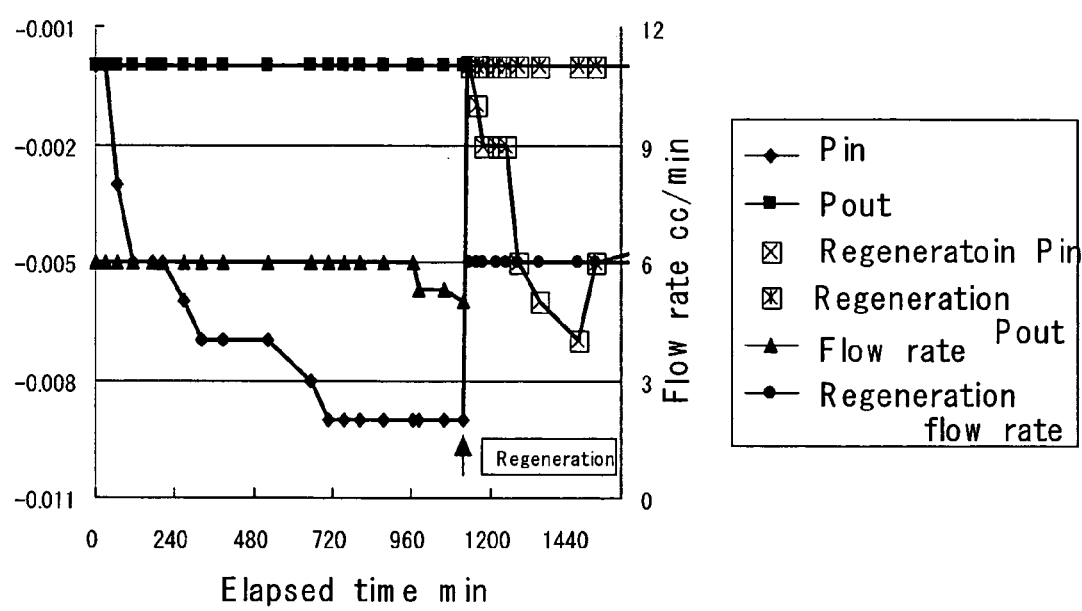
FIG. 14 is a characteristics diagram showing the operating circumstances of the filtration device of this preferred embodiment.

In FIG. 14, the Y-axis at the left side indicates pressure (unit: MPa) and the negative pressure becomes greater as the X-axis is approached. The Y-axis at the right side indicates the flow rate (unit: cc/minute). The X-axis indicates the time elapsed from film formation (unit: minutes).

An advantage of this preferred embodiment is that the flow rate and regeneration flow rate are controlled and maintained at 3 cc/hour in the second filter 2 formation process, the filtration process, and the post-regeneration filtration process. Thus in the film formation process, Pin is set to an extremely weak suction pressure of −0.001 MPa to −0.005 MPa to form second filter 2 with a softly adsorbed gel film.

Then in the filtration process, Pin is increased gradually from −0.005 MPa and filtration is continued while securing a fixed flow rate. Filtration is continued for approximately 1000 minutes and the regeneration process carried out when the flow rate begins to decrease. This is because, the gel film attaches thickly onto the surface of second filter 2 and causes clogging.

Then when the regeneration of second filter 2 is performed, filtration is continued at a fixed regeneration flow rate while gradually increasing the regeneration Pin. Regeneration of second filter 2 and refiltration are carried out until raw water 52 reaches a predetermined concentration, or to be more specific, until the degree of concentration is increased by 5 times to 10 times.

As an operation method that differs from that described above, a method of performing filtration by fixing the suction pressure at −0.005 MPa, at which the filtration flow rate is high, can also be employed. Though the filtration flow rate decreases gradually in accompaniment with the clogging of second filter 2 in this case, there is provided the advantage that the filtration time can be made long and the control of pump 57 is simplified. The regeneration of second filter 2 can thus be carried out when the filtration flow rate decrease to or below a fixed value.

Figure 15A:
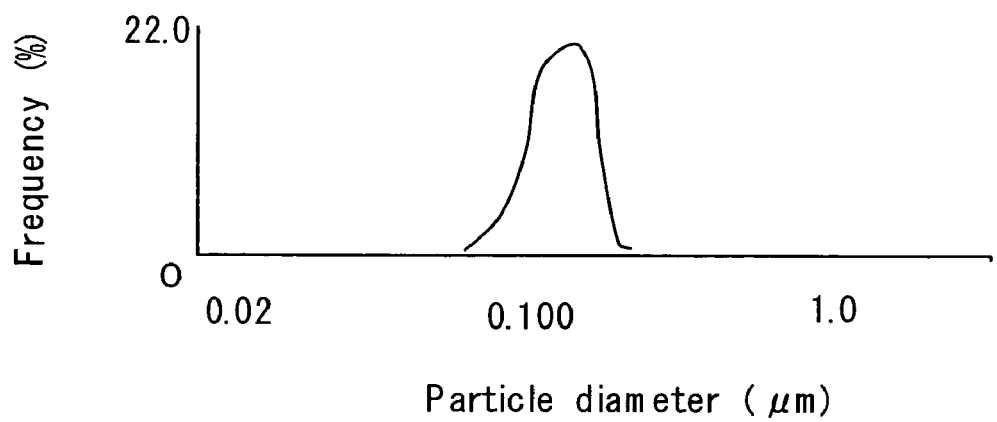
FIG. 15 is a characteristics diagram (A) and a characteristics diagram (B) showing the filtration characteristics of this preferred embodiment.

FIG. 15A shows the particle size distribution of abrasive grains contained in a CMP slurry. These abrasive grains are for CMP of an interlayer insulation film comprising Si oxide and the material comprises Si oxide and is generally called silica. The minimum particle size was approximately 0.076 μm and the maximum particle size was 0.34 μm. The larger particles are aggregate particles formed by aggregation of a plurality of the particles. The average particle size was approximately 0.1448 μm and the distribution peaks in the range of 0.13 μm to 0.15 μm near the average particle size.

As a slurry regulator, KOH or NH3 is generally used. The pH lies between approximately 10 and 11.

To be more specific, CMP abrasive grains that are mainly used are silica-based, alumina-based, cerium-oxide-based, or diamond-based, and besides these, there are chromium-oxide-based, iron-oxide-based, manganese-oxide-based, BaCO4-based, antimony-oxide-based, zirconia-based, and yttria-based abrasive grains. Silica-based abrasive grains are used for the smoothing of semiconductor interlayer insulation films, P—Si, SOI, etc., and the smoothing of Al.glass disks. Alumina-based abrasive grains are used for the polishing of hard disks and smoothing of metals in general, Si oxide films, etc. Cerium oxide is used for the polishing of glass and the polishing of Si oxide, and chromium oxide is used for mirror polishing of steel. Manganese oxide and BaCO4 are used for the polishing of tungsten wiring.

Furthermore, there are sols called oxide sols, with which colloid-size microparticles, comprising a metal oxide, such as silica, aluminum, zirconia, or partly comprising a hydroxide, are dispersed uniformly in water or other liquid. Such oxide sols are used for the smoothing of interlayer insulation films and metals of semiconductor devices and are also being considered for use for aluminum disks and other information disks.

Figure 15B:
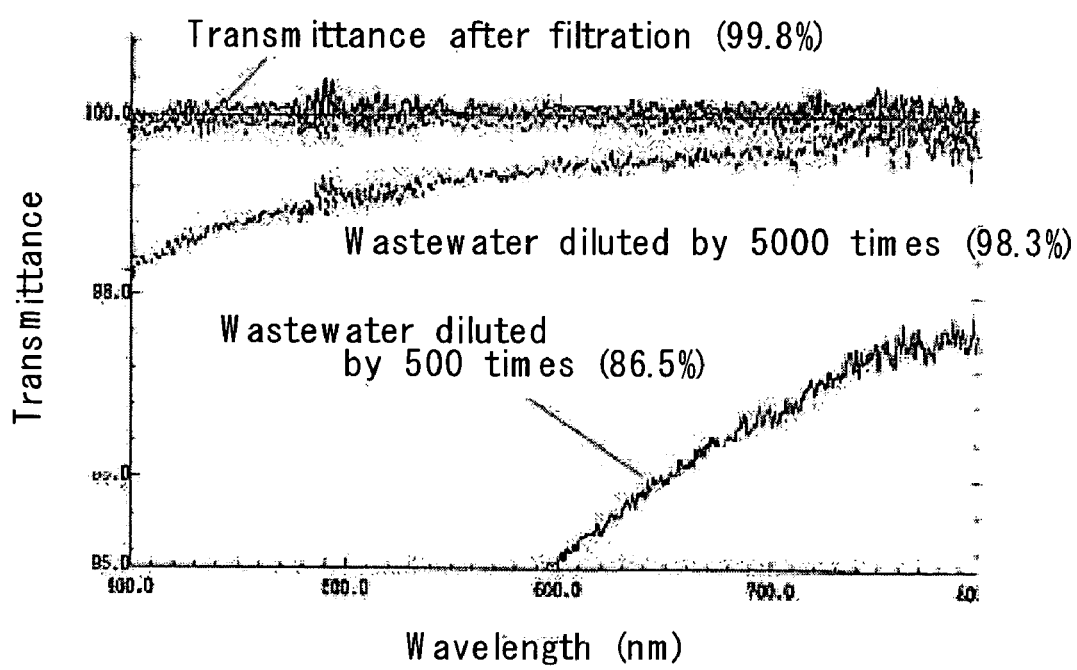
Figure 16:
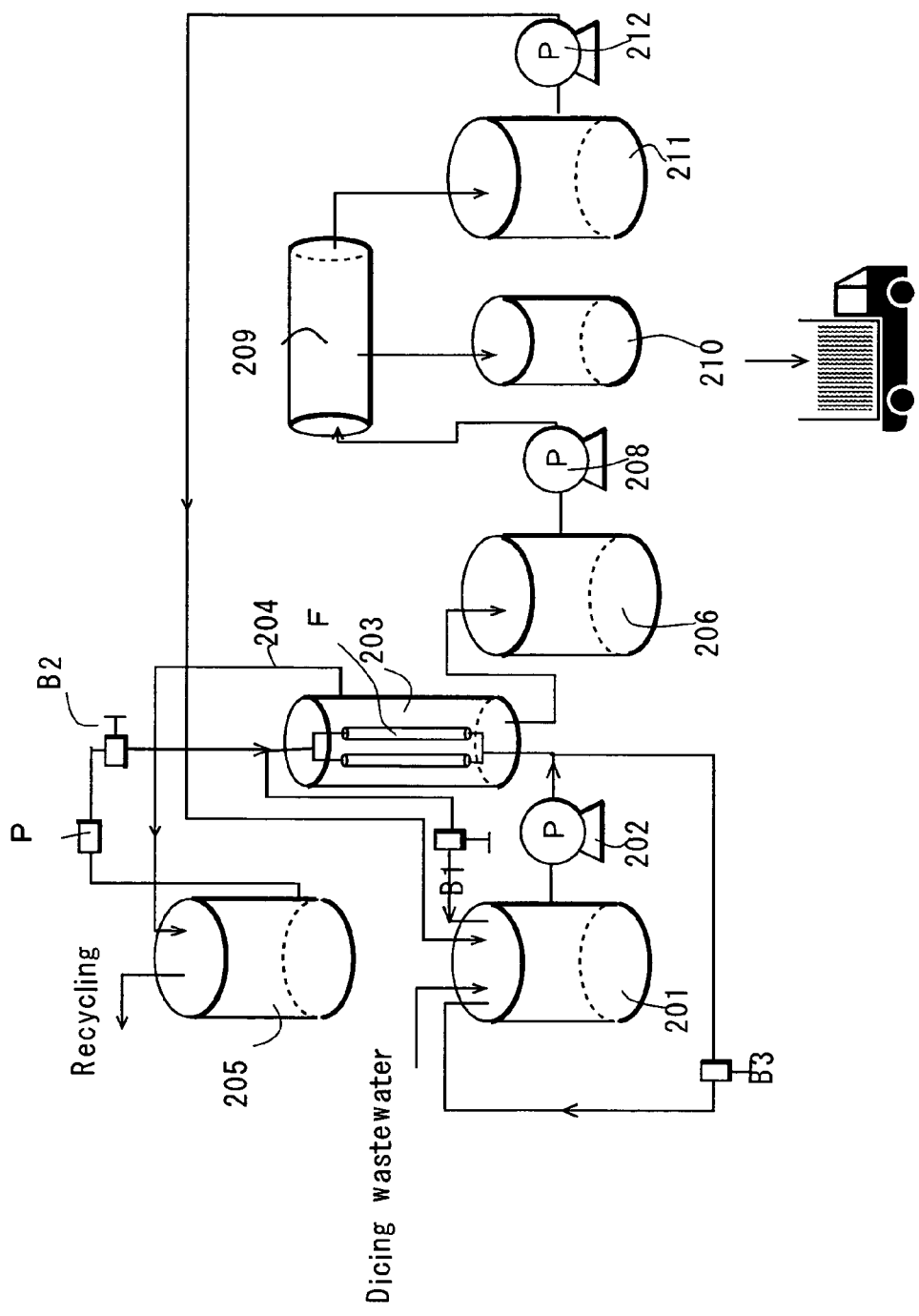
FIG. 16 is a schematic view showing a related-art filtration system.
Figure 17:
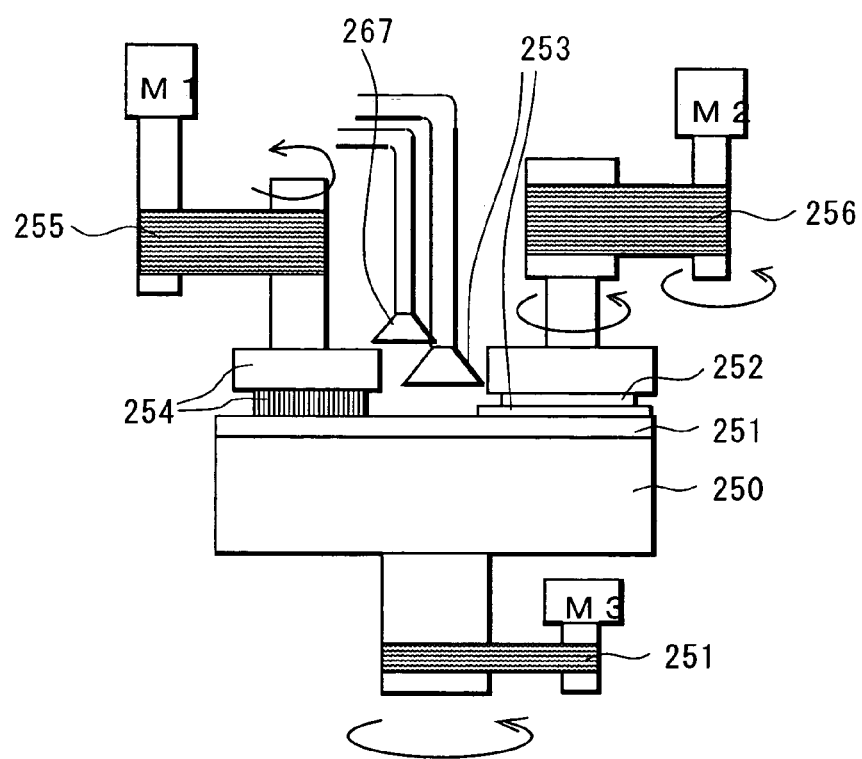
FIG. 17 is a schematic view showing a CMP device.
Figure 18:
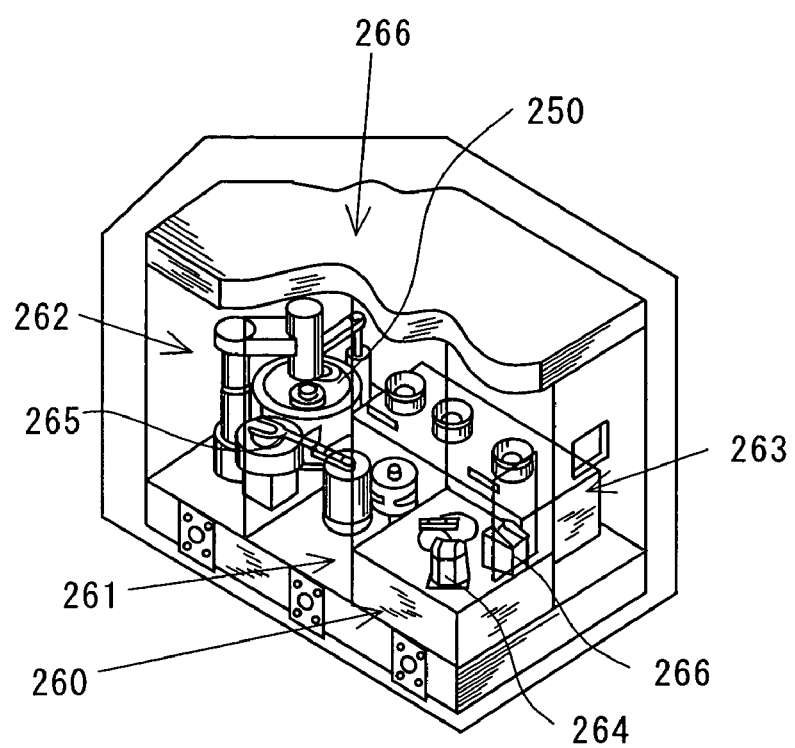
FIG. 18 is a schematic view showing a CMP device system.

FIG. 15B shows data indicating that CMP wastewater is filtrated and abrasive grains are captured. With this experiment, the undiluted slurry described above was diluted by 50 times, 500 times, and 5000 times with pure water to prepare test solutions. These three types of test solution were prepared under the hypothesis that since a wafer is washed with pure water in a CMP process, the wastewater will be diluted by approximately 50 times to 5000 times.

Measurements of the optical transmittance of these three types of test solution for light of a wavelength of 400 nm showed that of the test solution of 50 times dilution to be 22.5%, that of the test solution of 500 times dilution to be 86.5%, and that of the test solution of 5000 times dilution to be 98.3%. In principle, if abrasive grains are not contained in the wastewater, light will not be scattered, and the optical transmittance will take on a value infinitesimally close to 100%.

When a filter, with the above-described second filter film 13 formed, was immersed in each of the three types of test solution and filtration was carried out, the transmittance after filtration became 99.8% for all three types. Since the optical transmittance after filtration is greater than the optical transmittance prior to filtration, abrasive grains have been captured. The transmittance data for the test solution of 50 times dilution does not appear in the drawing since its value was too small.

The above results show that when objects of removal of a colloidal solution discharged from a CMP machine are filtrated using second filter 2 formed from a gel film of filtration unit 53 provided in this preferred embodiment's filtration device, filtration could be performed to a transmittance of 99.8%.

According to the above mentioned explanation, CMP wastewater that contains ammonia and sol-form microparticle components is regarded as a water to be treated. But some other wastewater is able to be regarded as a water to be treated.

More specifically, wastewater from the manufacture process of ITO(Indium Tin Oxide)film which is used as the clear cathode of the electrodes in liquid crystal display, be able to be purified by this preferred embodiment's filtration device or method. Wastewater from the manufacture process of powdered ITO(Indium Tin Oxide) contains ammonia and particles.

What is claimed is:

1. A water treatment device comprising:
   a first tank containing fluid containing objects of removal;
   a filter device disposed in the first tank and comprising a first filter immersed in the fluid and a second filter formed of a gel film adsorbed onto the first filter;
   a second tank containing fluid containing objects of removal;
   a pair of electrodes disposed in the fluid contained in the second tank; and
   a connecting pipe connecting the first and second tanks.

2. The device of claim 1, wherein the first and second tanks are configured so that the fluid flows from the second tank to the first tank through the connecting pipe.

3. The device of claim 1, wherein colloidal microparticles contained in the fluid are separated from the fluid by the filter device, and nitrogen compounds in the fluid are removed by the electrodes.

4. The device of claim 1, wherein a cathode of the electrodes comprises an electric conductor containing an element of group 1b or group 2b or group 8 of the periodic table or a coating comprising the element coated onto an electric conductor.

5. The device of claim 1, further comprising a pump drawing in the fluid via the connecting pipe and a second pipe taking the filtrated fluid out of the first tank so as to concentrate the objects of removal of the fluid in the first tank.

6. The device of claim 1, wherein the filter device comprises a frame supporting a periphery of the first filter.

7. The device of claim 1, wherein the fluid containing the objects of removal comprises a CMP slurry.

8. The device of claim 1, wherein the fluid is a solution containing indium or an indium compound.

9. A water treatment device comprising:
   a filter device comprising a first filter immersed in a fluid containing objects of removal and a second filter comprising a gel film disposed on the first filter; and
   a pair of electrodes removing nitrogen compounds from the fluid electrochemically,
   wherein the filter device and the electrodes are disposed in the same tank.

10. A water treatment device comprising:
    a filter device comprising a first filter immersed in a fluid containing objects of removal and a second filter comprising a gel film disposed on the first filter; and
    a pair of electrodes removing nitrogen compounds from the fluid electrochemically,
    wherein the filter device is disposed in a first tank in which the fluid is filtered by the filter device, and the electrodes are disposed in a second tank in which the filtered fluid is contained.

11. A water treatment method comprising:
    removing microparticle components contained in a fluid by filtering the fluid through a gel-form second filter formed on a surface of a first filter; and
    removing nitrogen compounds contained in the fluid electrochemically,
    wherein the nitrogen compounds are removed after removing the microparticle components.

12. A water treatment method comprising:
    removing microparticle components contained in a fluid by filtering the fluid through a gel-form second filter formed on a surface of a first filter; and removing nitrogen compounds contained in the fluid electrochemically, wherein the microparticle components are removed at the same time as the nitrogen compounds are removed.

13. The method of claim 11 or claim 12, wherein the electrochemical removal of the nitrogen compounds comprises having a pair of electrodes immersed in the fluid and applying electricity across the immersed electrodes.

14. The method of claim 11 or claim 12, wherein the second filter is formed with the microparticle components of colloidal form.

15. The method of claim 11 or claim 12, wherein the fluid comprises a CMP slurry.

16. The method of claim 11 or claim 12, wherein the fluid is a solution containing indium or an indium compound.

17. A water treatment method comprising:

removing microparticle components contained in a fluid by filtering the fluid through a gel-form second filter formed on a surface of a first filter; and removing nitrogen compounds contained in the fluid electrochemically, wherein the nitrogen compounds are removed after adding halogen ions or a compound containing a halogen element to the fluid.

18. The method of claim 17, wherein coagulated particles of the microparticle components are formed during the electrochemical removal and the coagulated particles are filtered by the second filter.

19. A water treatment device comprising:

an electrode comprising a metal from which coagulating ions are eluted, the coagulating ions congealing with objects of removal contained in a fluid;

a filter device filtering the fluid to separate coagulates of the objects of removal; and a tank in which the electrode and the filter device are disposed.

20. A water treatment device comprising:

an electrode which, by elution of coagulating ions that congeal with objects of removal contained in a fluid, forms coagulates of the objects of removal that are greater in diameter than the objects of removal;

a filter device filtering the fluid to separate the coagulates; and a tank in which the electrode and the filter device are disposed.

21. The device of claim 19 or claim 20, wherein the filter device comprises a first filter immersed in the fluid containing the objects of removal and a second filter formed of a gel film adsorbed onto the first filter.

22. The device of claim 21, wherein the gel film is formed from the coagulates of the objects of removal.

23. The device of claim 19 or claim 20, wherein the electrode comprises an element of group 8 of the periodic table or an electric conductor comprising an element of group 8, or a coating comprising the element or the electric conductor coated onto an electric conductor.

24. The device of claim 19 or claim 20, wherein the electrode comprises iron.

25. The device of claim 19 or claim 20, further comprising a pump drawing in the fluid via a first pipe and a second pipe taking the filtrated fluid out of the tank so as to concentrate the objects of removal of the fluid in the tank.

26. The device of claim 19 or claim 20, wherein the filter device comprises a first filter, a second filter and a frame supporting a periphery of the first filter, the second filter being adsorbed onto the first filter.

27. The device of claim 19 or claim 20, wherein nitrogen compounds contained in the fluid are removed by electrochemical actions of the electrode.

* * * * *